United States Patent
Tamaizumi et al.

(10) Patent No.: US 9,682,722 B2
(45) Date of Patent: Jun. 20, 2017

(54) ELECTRIC POWER STEERING APPARATUS AND CONTROLLING METHOD

(71) Applicant: JTEKT CORPORATION, Osaka-shi, Osaka (JP)

(72) Inventors: Terutaka Tamaizumi, Okazaki (JP); Hidenori Itamoto, Tajimi (JP); Shingo Maeda, Okazaki (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 14/960,586

(22) Filed: Dec. 7, 2015

(65) Prior Publication Data
US 2016/0159390 A1 Jun. 9, 2016

(30) Foreign Application Priority Data
Dec. 9, 2014 (JP) .................................. 2014-249083

(51) Int. Cl.
*B62D 5/04* (2006.01)
*B62D 15/02* (2006.01)

(52) U.S. Cl.
CPC ......... *B62D 5/0463* (2013.01); *B62D 5/0493* (2013.01); *B62D 15/025* (2013.01)

(58) Field of Classification Search
CPC ... B62D 5/0463; B62D 5/0498; B62D 15/025
See application file for complete search history.

(56) References Cited

U.S. PATENT DOCUMENTS

| 5,839,537 A | 11/1998 | Nishino et al. |
| 6,360,153 B1 | 3/2002 | Shinmura et al. |
| 2014/0343789 A1 | 11/2014 | Maeda et al. |

FOREIGN PATENT DOCUMENTS

| EP | 2 803 557 A2 | 11/2014 |
| JP | 2010-155598 A | 7/2010 |

OTHER PUBLICATIONS

May 13, 2016 Extended Search Report issued in European Patent Application No. 15198265.9.

*Primary Examiner* — Michael D Lang
(74) *Attorney, Agent, or Firm* — Oliff PLC

(57) ABSTRACT

An electric power steering apparatus includes a control unit that calculates an assist controlled variable based on a plurality of types of state variables indicating steering statuses and controls a motor that serves as a generation source of an assist force applied to a steering mechanism of a vehicle based on the assist controlled variable. The control unit is configured to separately set limit values, which limit a change range of the assist controlled variable according to the respective state variables used to calculate the assist controlled variable, to the respective state variables, add up the limit values to generate ultimate limit value for the assist controlled variable, and perform limitation processing to limit the ultimate limit value for an assist controlled variable having a sign opposite to a sign of a steering torque that is one of the plurality of types of state variables.

11 Claims, 16 Drawing Sheets

F I G . 12
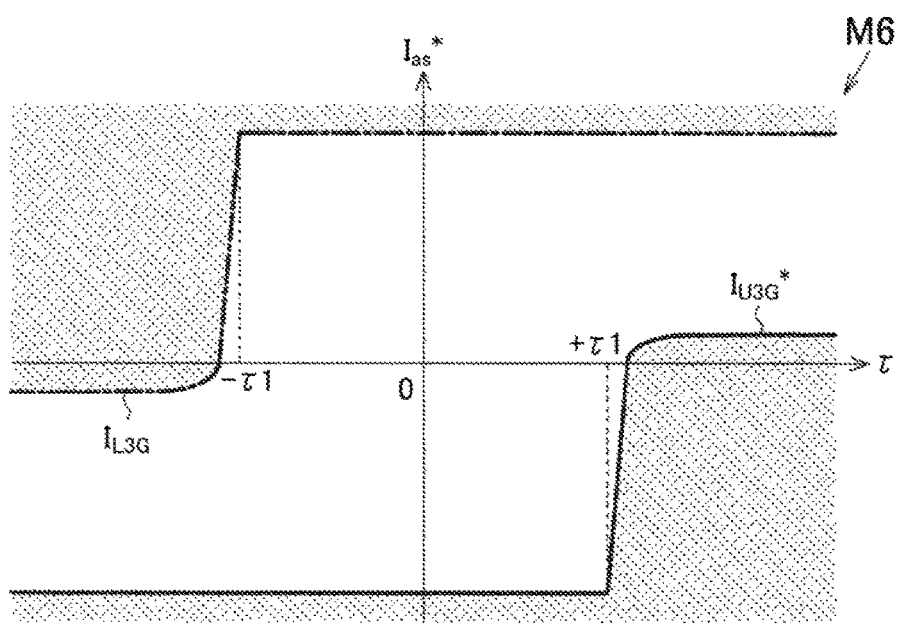

F I G. 14A
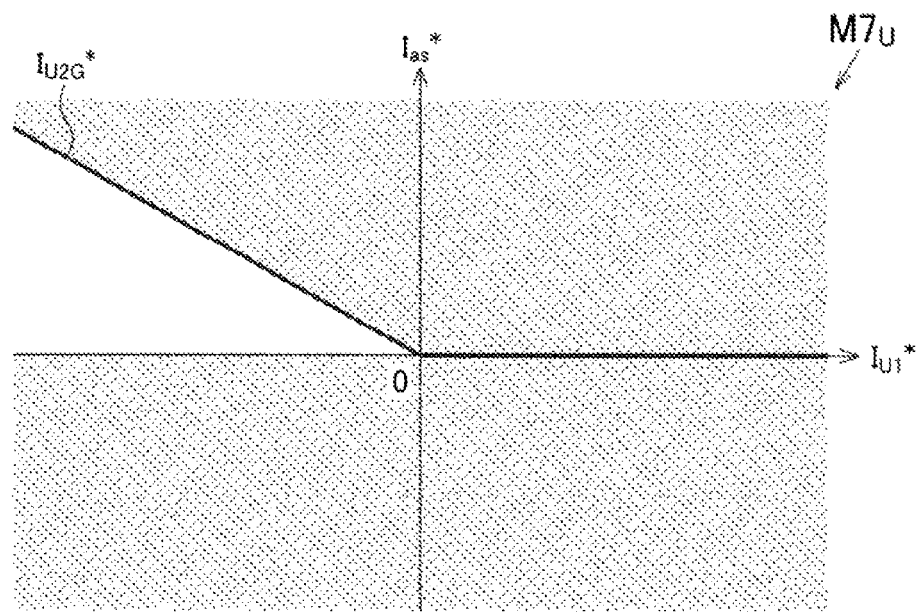
F I G. 14B
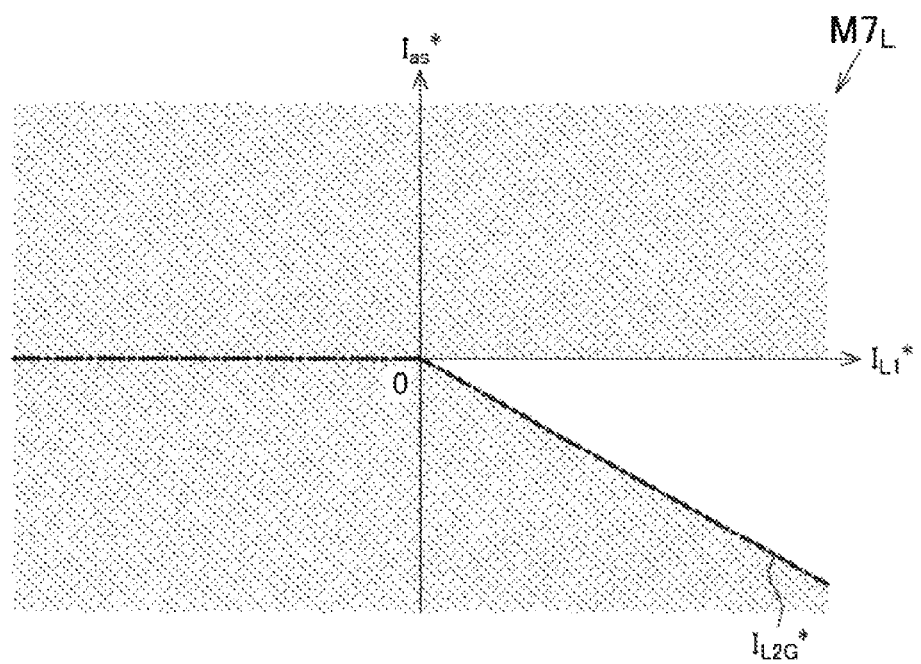

F I G . 16
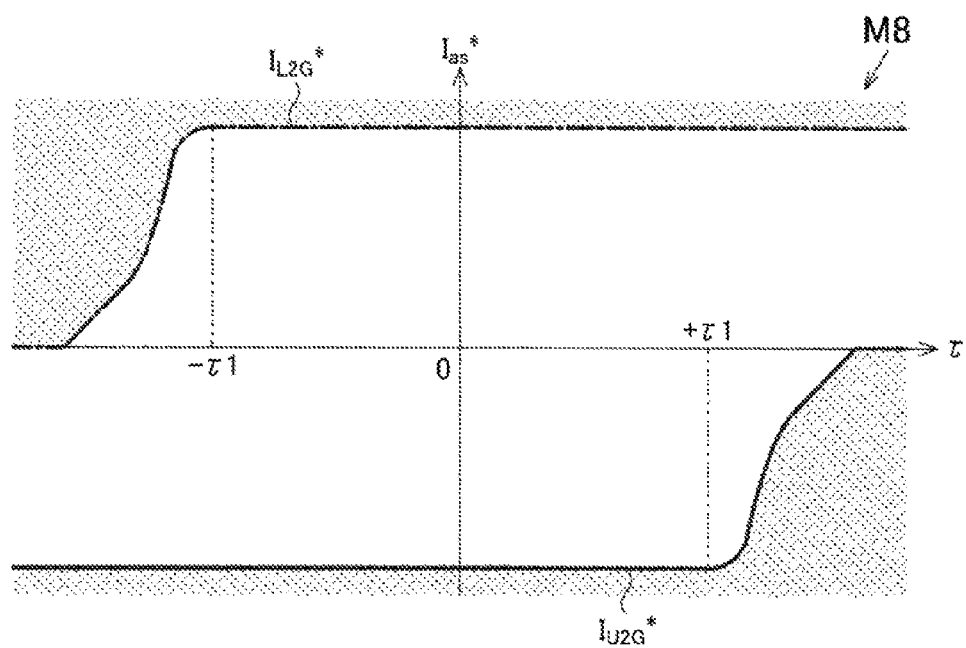

ELECTRIC POWER STEERING APPARATUS AND CONTROLLING METHOD

INCORPORATION BY REFERENCE

The disclosure of Japanese Patent Application No. 2014-249083 filed on Dec. 9, 2014 including the specification, drawings and abstract is incorporated herein by reference in its entirety.

BACKGROUND OF THE INVENTION

1. Field of the Invention

The invention relates to an electric power steering (EPS) apparatus and a controlling method for the same.

2. Description of Related Art

As described in, for example, Japanese Patent Application Publication No. 2010-155598 (JP 2010-155598 A), an EPS apparatus applies the torque of a motor to the steering mechanism of a vehicle to assist the steering operation of a driver. The EPS performs the feedback control of motor current to generate an appropriate assist force according to at least a steering torque. That is, the EPS adjusts motor application voltage through the adjustment of a PWM duty to reduce the difference between an assist current command value calculated based on at least a steering torque and a motor current detection value.

In order to respond to requests for high safety, the EPS of JP 2010-155598 A employs the following configuration. That is, the EPS limits an assist current command value to a preset upper or lower limit when the directions of a steering torque and an assist current command value agree with each other. On the other hand, when the directions of a steering torque and an assist current command value are opposite to each other, the EPS determines that abnormality has occurred in assist control calculation and limits the assist current command value to zero.

SUMMARY OF THE INVENTION

However, there is the following concern about the EPS of JP 2010-155598 A. That is, the EPS of JP 2010-155598 A cannot limit an assist current command value to zero when a steering torque falls within a small range (positive and negative certain range centering on zero). Generally, an assist current command value is generated by superimposing a compensation amount for adjusting steering behavior on a basic component based on a steering torque, but there is a case that the direction of the compensation amount does not agree with that of the steering torque. When a steering torque is large, a compensation amount is cancelled by a basic component even when the direction of the compensation amount does not agree with that of a steering torque. Therefore, the direction of an assist current command value itself agrees with that of the steering torque. Accordingly, the disagreement between the direction of an assist current command value and the direction of a steering torque may be regarded as the abnormality of assist control calculation. However, a basic component becomes small when a steering torque falls within a small range, and the ratio of a compensation amount to an assist current command value becomes large. Therefore, even when assist control calculation is normally performed, there is a case that the direction of the assist current command value does not agree with that of a steering torque. When an assist current command value is limited to zero in such a case, there is a likelihood that steering behavior may not be adjusted. In view of this, the EPS of JP 2010-155598 A does not limit an assist current command value to zero when a steering torque falls within a small range, and limits an assist current command value in an extended range in which a compensation amount is not limited. Therefore, even when an abnormal assist current command value is falsely calculated due to any reason, the assist current command value is not sufficiently limited in a region in which a steering torque falls within a small range. Therefore, an unintended assist force is applied to a steering mechanism, and in some cases there is a likelihood that a self-assist occurs.

An aspect of the invention provides an EPS apparatus and a controlling method for the same capable of applying a more appropriate assist force to a steering mechanism.

An EPS apparatus according to a first aspect of the invention includes a control unit that calculates an assist controlled variable based on a plurality of types of state variables indicating steering statuses and controls a motor that serves as a generation source of an assist force applied to a steering mechanism of a vehicle based on the assist controlled variable. The control unit is configured to separately set limit values, which limit a change range of the assist controlled variable according to the respective state variables used to calculate the assist controlled variable, to the respective state variables, and add up the limit values to generate ultimate limit value for the assist controlled variable.

According to the aspect, limit values for an assist controlled variable are separately set to respective state variables used to calculate the assist controlled variable. Even when an assist controlled variable indicating an abnormal value is calculated due to any reason, a change range of the assist controlled variable is limited using respective limit values to prevent an unintended assist force from being applied to a steering mechanism. In addition, since limit values for an assist controlled variable are separately set to respective state variables used to calculate the assist controlled variable, there is no need to consider influence on control based on other state variables and it becomes possible to perform more precise and accurate limitation processing on the assist controlled variable.

In the above aspect, the control unit is configured to perform limitation processing to limit the ultimate limit value for an assist controlled variable having a sign opposite to a sign of a steering torque that is one of the plurality of types of state variables.

According to the aspect, ultimate limit value for an assist controlled variable having a sign opposite to a sign of a steering torque are limited. Therefore, when an abnormal assist controlled variable having a sign opposite to a sign of a steering torque is calculated due to any reason, so-called a reverse assist in a direction in which the steering of a driver is hindered is prevented.

In the above aspect, the limit values separately set to the respective state variables may include a first limit value group used to limit an assist controlled variable having a sign same as a sign of a steering torque and a second limit value group used to limit an assist controlled variable having a sign opposite to the sign of the steering torque, the control unit may be configured to add up the limit values constituting the first limit value group to calculate first added value, add up the limit values constituting the second limit value group to calculate second added value, and add up the first added value and the second added value to calculate third added value as the ultimate limit value for the assist controlled variable, and the control unit may be configured to limit the third added value to limit the ultimate limit value for the assist controlled variable having the sign opposite to the sign of the steering torque.

In the above configuration, the control unit may be configured to perform limitation processing on the third added value when an absolute value of the steering torque reaches a setting value.

With an increase in the absolute value of a steering torque, there is large influence when an abnormal assist controlled variable in a direction opposite to the direction of a steering torque is calculated. Therefore, when the absolute value of a steering torque reaches a size of a certain degree, ultimate limit value for an assist controlled variable in a direction opposite to the direction of the steering torque may be limited through the limitation processing on the third added value.

In the above configuration, the control unit may have a guard map that defines a relationship between the steering torque and limit values for the third added value and has a characteristic in which the limit values for the third added value gradually decrease toward zero after an absolute value of the steering torque reaches the setting values, and the control unit may be configured to decrease the limit values for the third added value toward zero based on the guard map as the limitation processing on the third added value.

In the above configuration, the control unit may have a torque gain map that defines a relationship between the steering torque and a gain and has a characteristic in which the gain gradually decreases toward zero after the absolute value of the steering torque reaches a setting value, and the control unit may be configured to multiply the third added value by the gain based on the torque gain map as the limitation processing on the third added value.

In the above aspect, the limit values separately set to the respective state variables may include a first limit value group used to limit an assist controlled variable having a sign same as a sign of a steering torque and a second limit value group used to limit an assist controlled variable having a sign opposite to the sign of the steering torque, the control unit may be configured to add up the limit values constituting the first limit value group to calculate first added value, add up the limit values constituting the second limit value group to calculate second added value, and add up the first added value and the second added value to calculate third added value as the ultimate limit value for the assist controlled variable, and the control unit may be configured to limit the second added value to limit the ultimate limit value for the assist controlled variable having the sign opposite to the sign of the steering torque.

In the above configuration, the control unit may be configured to limit the second added value according to the first added value. According to the configuration, second added value obtained by adding up the limit values of a second limit value group used to limit an assist controlled variable having a sign opposite to the sign of a steering torque may be limited according to first added value obtained by adding up the limit values of a first limit value group used to limit an assist controlled variable having a sign the same as the sign of a steering torque. Therefore, an allowed range of an assist controlled variable having a sign opposite to the sign of a steering torque is prevented from excessively extending.

In the above configuration, the control unit may be configured to perform limitation processing on the second added value when an absolute value of the steering torque reaches setting values.

With an increase in the absolute value of a steering torque, there is large influence on steering behavior when an abnormal assist controlled variable in a direction opposite to the direction of the steering torque is calculated. Therefore, when the absolute value of a steering torque reaches a size of a certain degree, ultimate limit value used to limit an assist controlled variable in a direction opposite to the direction of the steering torque may be limited by limitation processing on second added value. In this way, influence on steering behavior when an abnormal assist controlled variable in a direction opposite to the direction of a steering torque is calculated may be prevented.

In the above configuration, the control unit may have a guard map that defines a relationship between the steering torque and limit values for the second added value and has a characteristic in which the limit values for the second added value gradually decrease toward zero after an absolute value of the steering torque reaches setting values, and the control unit may be configured to decrease the limit values for the second added value toward zero based on the guard map as the limitation processing on the second added value.

In the above configuration, the control unit may have a torque gain map that defines a relationship between the steering torque and a gain and has a characteristic in which the gain gradually decreases toward zero after an absolute value of the steering torque reaches the setting value, and the control unit may be configured to multiply the second added value by the gain based on the torque gain map as the limitation processing on the second added value.

A controlling method for an EPS apparatus according to a second aspect of the invention includes: calculating an assist controlled variable based on a plurality of types of state variables indicating steering statuses; controlling a motor that serves as a generation source of an assist force applied to a steering mechanism of a vehicle based on the assist controlled variable; separately setting limit values that limit a change range of the assist controlled variable according to the respective state variables used to calculate the assist controlled variable to the respective state variables; adding up the limit values to generate ultimate limit value for the assist controlled variable; and performing limitation processing to limit the ultimate limit value for an assist controlled variable having a sign opposite to a sign of a steering torque that is one of the plurality of types of state variables.

According to the aspect, the same effects as those of the first aspect may be obtained.

In the EPS apparatus according to the first and second aspects of the invention, it is possible to apply a more appropriate assist force to a steering mechanism.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 12 is a guard map showing the relationship between steering torques and guard values on ultimate limit values according to the first embodiment;

FIG. 14A is a guard map showing the relationship between added values of respective limit values according to a steering angle, a steering speed, and a steering angle acceleration and guard values on the added values according to the second embodiment;

FIG. 14B is a guard map showing the relationship between added values of respective limit values according to a steering angle, a steering speed, and a steering angle acceleration and guard values on the added values according to the second embodiment;

FIG. 16 is a guard map showing the relationship between added values of respective limit values according to a steering angle, a steering speed, and a steering angle acceleration and steering torques according to the third embodiment;

DETAILED DESCRIPTION OF EMBODIMENTS

Figure 1:
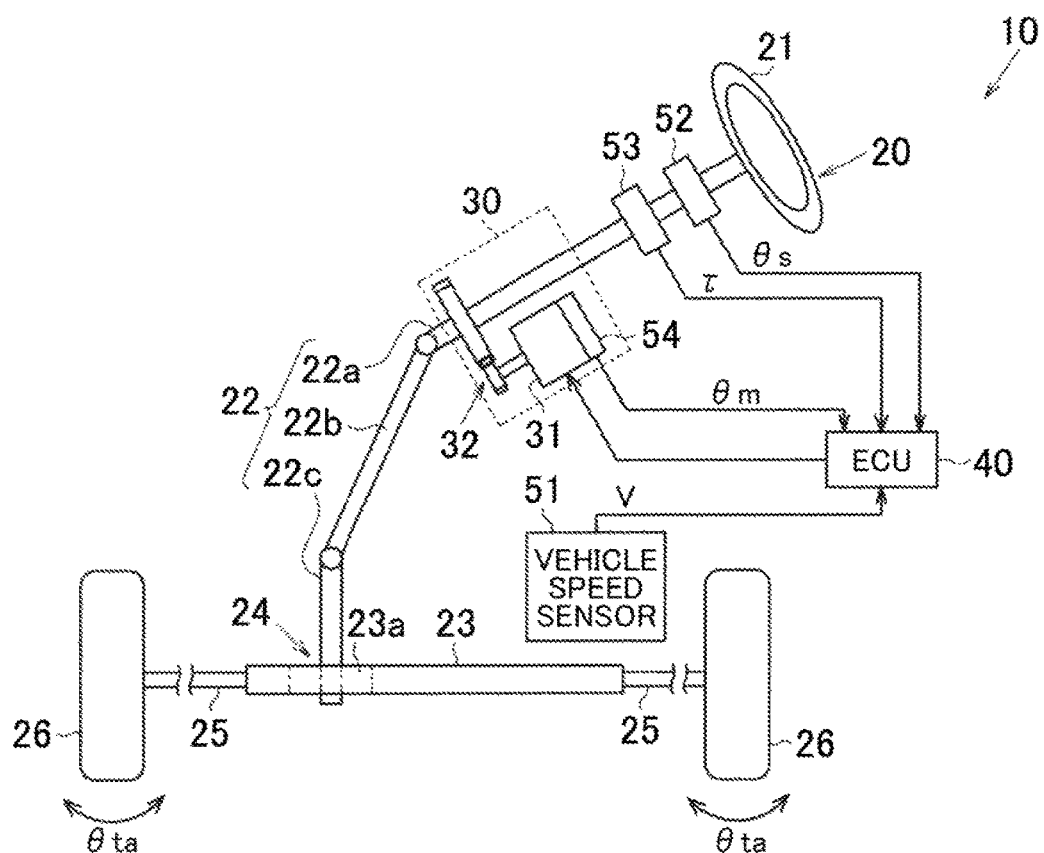
FIG. 1 is a schematic configuration diagram of an EPS apparatus according to a first embodiment.

Hereinafter, a description will be given of a first embodiment of an EPS apparatus. As shown in FIG. 1, an EPS apparatus 10 has a steering mechanism 20 that steers a steering wheel based on the steering operation of a driver, a steering assist mechanism 30 that assists the steering operation of the driver, and an electronic control unit (ECU) 40 that controls the operation of the steering assist mechanism 30.

The steering mechanism 20 has a steering wheel 21 operated by a driver and a steering shaft 22 that integrally rotates with the steering wheel 21. The steering shaft 22 has a column shaft 22a coupled to the center of the steering wheel 21, an intermediate shaft 22b coupled to the lower end of the column shaft 22a, and a pinion shaft 22c coupled to the lower end of the intermediate shaft 22b. The lower end of the pinion shaft 22c is meshed with a rack shaft 23 (exactly, a portion 23a having rack teeth) extending in a direction crossing the pinion shaft 22c. Accordingly, the rotational motion of the steering shaft 22 is converted into the reciprocating linear motion of the rack shaft 23 by a rack and pinion mechanism 24 having the pinion shaft 22c and the rack shaft 23. When the reciprocating linear motion is transmitted to right and left steering wheels 26 and 26 via tie rods 25 respectively coupled to both ends of the rack shaft 23, steering angles θta of the steering wheels 26 and 26 are changed.

The steering assist mechanism 30 has a motor 31 that serves as the generation source of a steering assist force. As the motor 31, a brushless motor or the like is employed. The motor 31 is coupled to the column shaft 22a via a deceleration mechanism 32. The deceleration mechanism 32 decelerates the rotation of the motor 31 and transmits a decelerated rotation force to the column shaft 22a. That is, when the torque of the motor is applied to the steering shaft 22 as a steering assist force (assist force), the steering operation of a driver is assisted.

The ECU 40 acquires detection results of various sensors provided in a vehicle as information indicating requests by a driver or running statuses and controls the motor 31 according to the various information thus acquired.

As the various sensors, a vehicle speed sensor 51, a steering sensor 52, a torque sensor 53, and a rotation angle sensor 54 are, for example, provided. The vehicle speed sensor 51 detects a vehicle speed V (running speed of a vehicle). The steering sensor 52 is a magnetic rotation angle sensor and provided on the column shaft 22a to detect a steering angle θs. The torque sensor 53 is provided on the column shaft 22a to detect a steering torque τ. The rotation angle sensor 54 is provided on the motor 31 to detect a rotation angle θm of the motor 31.

The ECU 40 calculates a target assist force based on a vehicle speed V, a steering angle θs, a steering torque τ, and a rotation angle θm and supplies driving power to generate the target assist force in the steering assist mechanism 30 to the motor 31.

Figure 2:
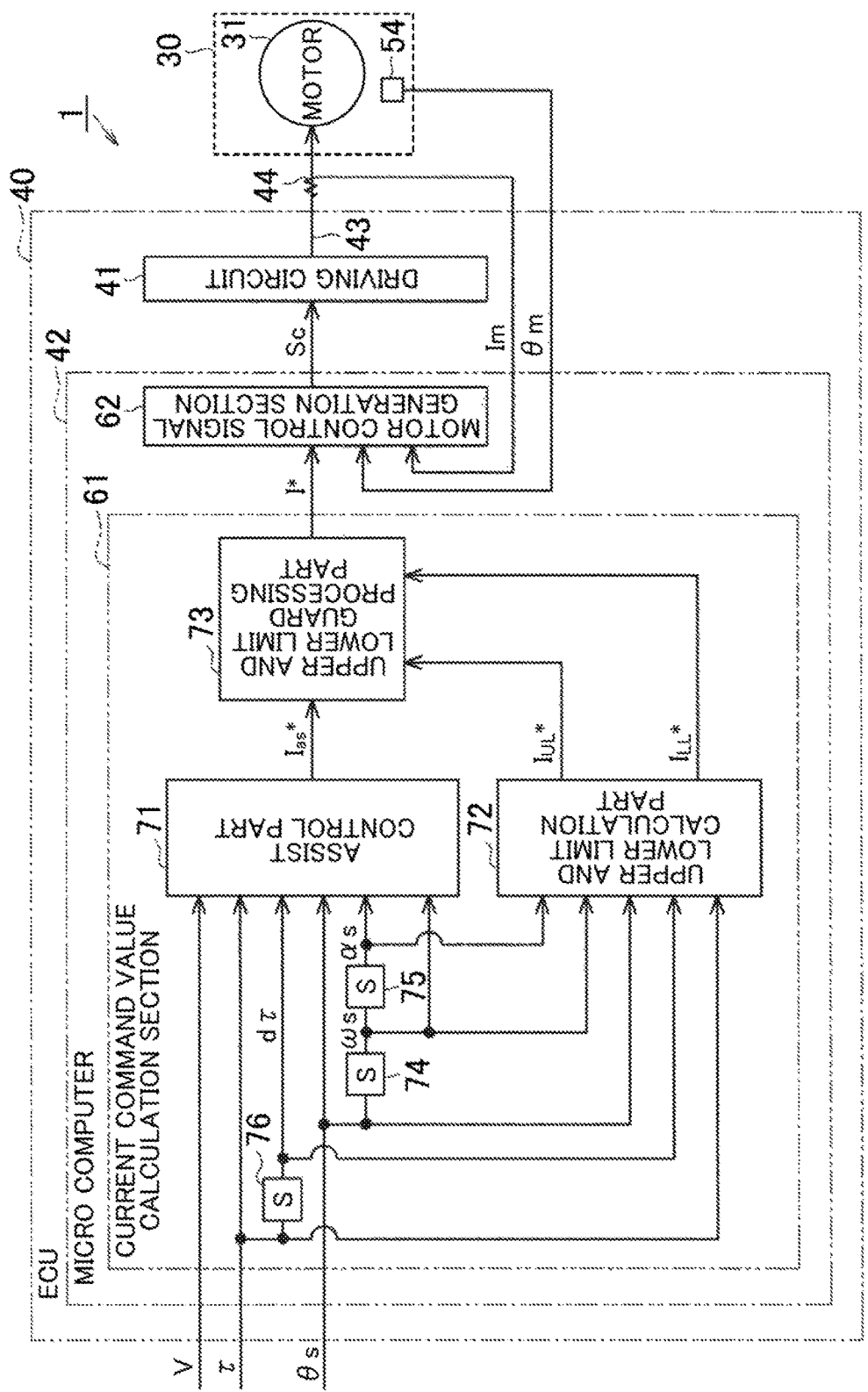
FIG. 2 is a control block diagram of the EPS apparatus according to the first embodiment.

Next, a description will be given of the hardware configuration of the ECU. As shown in FIG. 2, the ECU 40 has a driving circuit (inverter circuit) 41 and a micro computer 42.

The driving circuit 41 converts direct power supplied from a direct power supply such as a battery into three-phase current power based on a motor control signal Sc (PWM driving signal) generated by the micro computer 42. The converted three-phase current power is supplied to the motor 31 via feeder circuits 43 of respective phases. The feeder circuits 43 of the respective phases have current sensors 44. The current sensors 44 detect an actual current value Im generated in the feeder circuits 43 of the respective phases. Note that the feeder circuits 43 of the respective phases and the current sensors 44 of the respective phases are each unified in FIG. 2 for the purpose of illustration.

The micro computer 42 acquires detection results of the vehicle speed sensor 51, the steering sensor 52, the torque sensor 53, the rotation angle sensor 54, and the current sensors 44 with respective preset sampling cycles. The micro computer 42 generates a motor control signal Sc based on the acquired detection results, i.e., a vehicle speed V, a steering angle θs, a steering torque τ, a rotation angle θm, and an actual current value Im.

Next, a description will be given of the functional configuration of the micro computer. The micro computer 42 has various calculation processing sections implemented when a control program stored in a storage unit (not shown) is performed.

As shown in FIG. 2, the micro computer 42 has a current command value calculation section 61 and a motor control signal generation section 62 as the calculation processing sections. The current command value calculation section 61 calculates a current command value I* based on a steering torque τ, a vehicle speed V, and a steering angle θ. The current command value I* is a command value indicating current to be supplied to the motor 31. Exactly, the current command value I* includes a q-axis current command value and a d-axis current command value in a d/q coordinate system. In the embodiment, the d-axis current command value is set at zero. The d/q coordinate system is a rotating coordinate system following a rotation angle θm of the motor 31. The motor control signal generation section 62 converts current values Im of the three phases of the motor 31 into vector components of two phases, i.e., a d-axis current value and a q-axis current value in the d/q coordinate system using the rotation angle θm. Then, the motor control signal generation section 62 calculates the deviation between the d-axis current value and the d-axis current command value and the deviation between the q-axis current value and the q-axis current command value and generates a motor control signal Sc so as to solve the deviations.

Next, a description will be given of the current command value calculation section. As shown in FIG. 2, the current command value calculation section 61 has an assist control part 71, an upper and lower limit calculation part 72, and an upper and lower limit guard processing part 73. In addition, the current command value calculation section 61 has three differentiators 74, 75, and 76. The differentiator 74 differentiates a steering angle θs to calculate a steering speed ωs. The differentiator 75 differentiates a steering speed ωs calculated by the preceding differentiator 74 to calculate a steering angle acceleration αs. The differentiator 76 differentiates a steering torque τ by a time to calculate a steering torque differential value dτ.

The assist control part 71 calculates an assist controlled variable $I_{as}^*$ based on a steering torque τ, a vehicle speed V, a steering angle θs, a steering speed ωs, a steering angle acceleration αs, and a steering torque differential value dτ. The assist controlled variable $I_{as}^*$ is a value (current value) of an amount of current supplied to the motor 31 to generate an appropriate target assist force according to these state variables.

The upper and lower limit calculation part 72 calculates an upper limit $I_{UL}^*$ and a lower limit $I_{LL}^*$ as limit values for an assist controlled variable $I_{as}^*$ based on various signals used in the assist control part 71, here, a steering torque τ, a steering angle θs, a steering torque differential value dτ, a steering speed ωs, and a steering angle acceleration αs. The upper limit $I_{UL}^*$ and the lower limit $I_{LL}^*$ are ultimate limit values for the assist controlled variable $I_{as}^*$.

The upper and lower limit guard processing part 73 performs limitation processing on an assist controlled variable $I_{as}^*$ based on an upper limit $I_{UL}^*$ and a lower limit $I_{LL}^*$ calculated by the upper and lower limit calculation part 72. That is, the upper and lower limit guard processing part 73 compares a value of the assist controlled variable $I_{as}^*$ with the upper limit $I_{UL}^*$ and the lower limit $I_{LL}^*$. The upper and lower limit guard processing part 73 limits the assist controlled variable $I_{as}^*$ to the upper limit $I_{UL}^*$ when the assist controlled variable $I_{as}^*$ exceeds the upper limit $I_{UL}^*$ and limits the assist controlled variable $I_{as}^*$ to the lower limit $I_{LL}^*$ when the assist controlled variable $I_{as}^*$ falls below the lower limit $I_{LL}^*$. The assist controlled variable $I_{as}^*$ subjected to the limitation processing becomes a ultimate current command value I*. Note that when the assist controlled variable $I_{as}^*$ falls within the upper limit $I_{UL}^*$ and the lower limit $I_{LL}^*$, the assist controlled variable $I_{as}^*$ calculated by the assist control part 71 becomes the ultimate current command value I* as it is.

Figure 3:
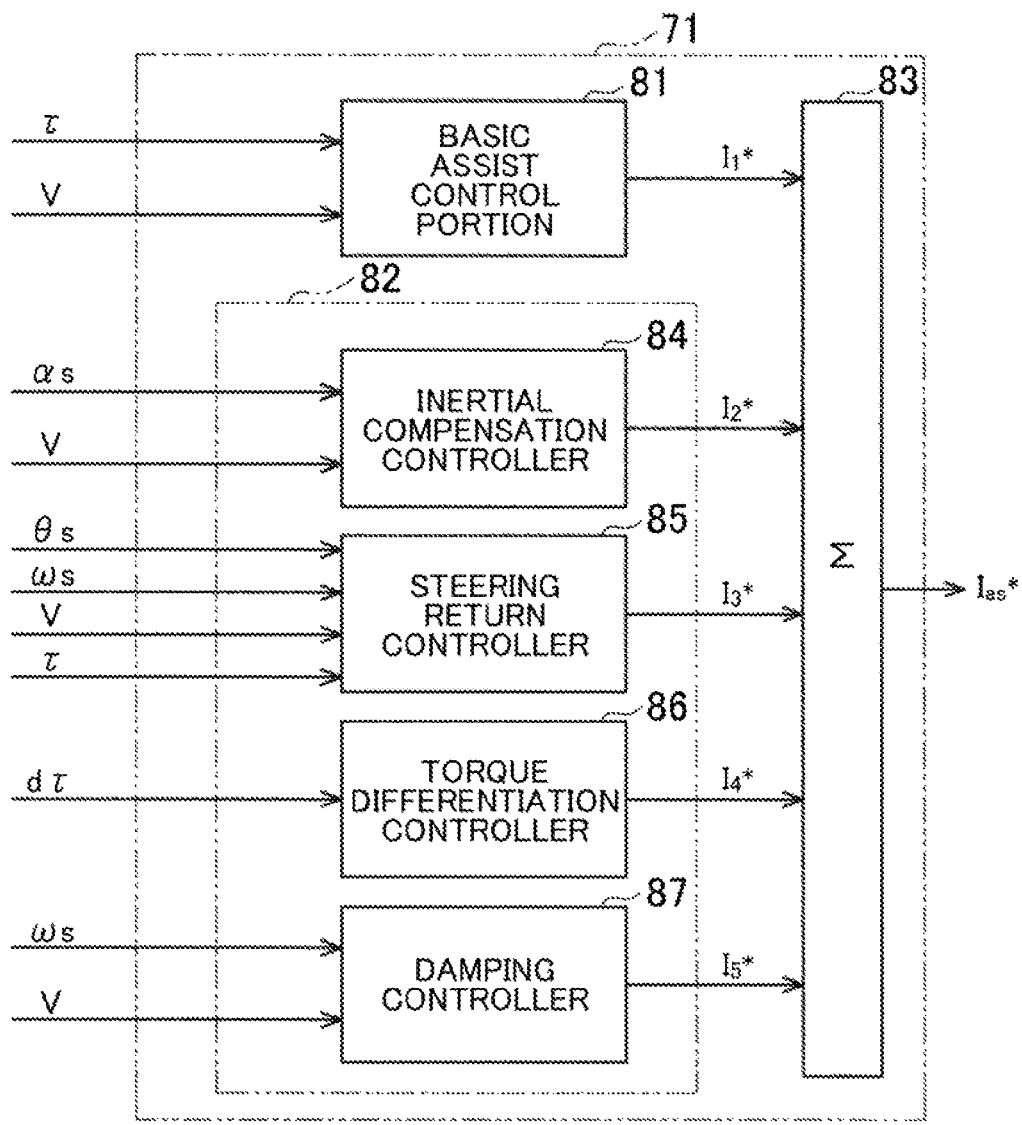
FIG. 3 is a control block diagram of an assist control part according to the first embodiment.

Next, a description will be given in detail of the assist control part 71. As shown in FIG. 3, the assist control part 71 has a basic assist control portion 81, a compensation control portion 82, and an adder 83.

The basic assist control portion 81 calculates a basic assist controlled variable $I_1^*$ based on a steering torque τ and a vehicle speed V. A basic assist controlled variable $I_1^*$ is a basic component (current value) used to generate an appropriate target assist force according to a steering torque τ and a vehicle speed V. The basic assist control portion 81 calculates a basic assist controlled variable $I_1^*$ using, for example, an assist characteristics map stored in the storage unit (not shown) of the micro computer 42. The assist characteristics map is a three dimensional map of a vehicle speed responsive type used to calculate a basic assist controlled variable $I_1^*$ based on a steering torque τ and a vehicle speed V and is set such that a basic assist controlled variable $I_1^*$ having a lager value (absolute value) is calculated as a steering torque τ (absolute value) is larger and a vehicle speed V is smaller.

The compensation control portion 82 performs various compensation control on a basic assist controlled variable $I_1^*$ to realize more enhanced steering feelings. The compensation control portion 82 has, for example, an inertia compensation controller 84, a steering return controller 85, a torque differentiation controller 86, and a damping controller 87.

The inertia compensation controller 84 calculates a compensation amount $I_2^*$ (current value) to compensate for the inertia of the motor 31 based on a steering angle acceleration αs and a vehicle speed V. By the correction of a basic assist controlled variable $I_1^*$ using a compensation amount $I_2^*$, the feeling of being caught (delay in following) at the start of turning the steering wheel 21 and the feeling of being pulled (overshoot) at the end of turning the steering wheel 21 are reduced.

The steering return controller 85 calculates a compensation amount $I_3^*$ (current value) to compensate for the return characteristics of the steering wheel 21 based on a steering torque τ, a vehicle speed V, a steering angle θs, and a steering speed ωs. By the correction of a basic assist controlled variable $I_1^*$ using a compensation amount $I_3^*$, the excess and deficiency of a self aligning torque due to a road surface reaction force is compensated. This is because an assist force in a direction in which the steering wheel 21 returns to its neutral position is generated according a compensation amount $I_3^*$.

The torque differentiation controller 86 detects a reverse input vibration component as a steering torque differential value dτ and calculates a compensation amount $I_4^*$ (current value) to compensate for disturbance such as reverse input vibration based on the detected steering torque differential value dτ. By the correction of a basic assist controlled variable $I_1^*$ using a compensation amount $I_4^*$, disturbance such as brake vibration occurring with a braking operation is reduced. This is because an assist force in a direction in which reverse input vibration is cancelled is generated according to a compensation amount $I_4^*$.

The damping controller 87 calculates a compensation amount $I_5^*$ (current value) to compensate for the viscosity of a steering system based on a steering speed ωs and a vehicle speed V. By the correction of a basic assist controlled variable $I_1^*$ using a compensation amount $I_5^*$, wiggle vibration or the like transmitted to the steering wheel 21 is, for example, reduced.

The adder 83 adds up compensation amounts $I_2^*, I_3^*, I_4^*$, and $I_5^*$ to generate an assist controlled variable $I_{as}^*$ as compensation processing on a basic assist controlled variable $I_1^*$.

Figure 4:
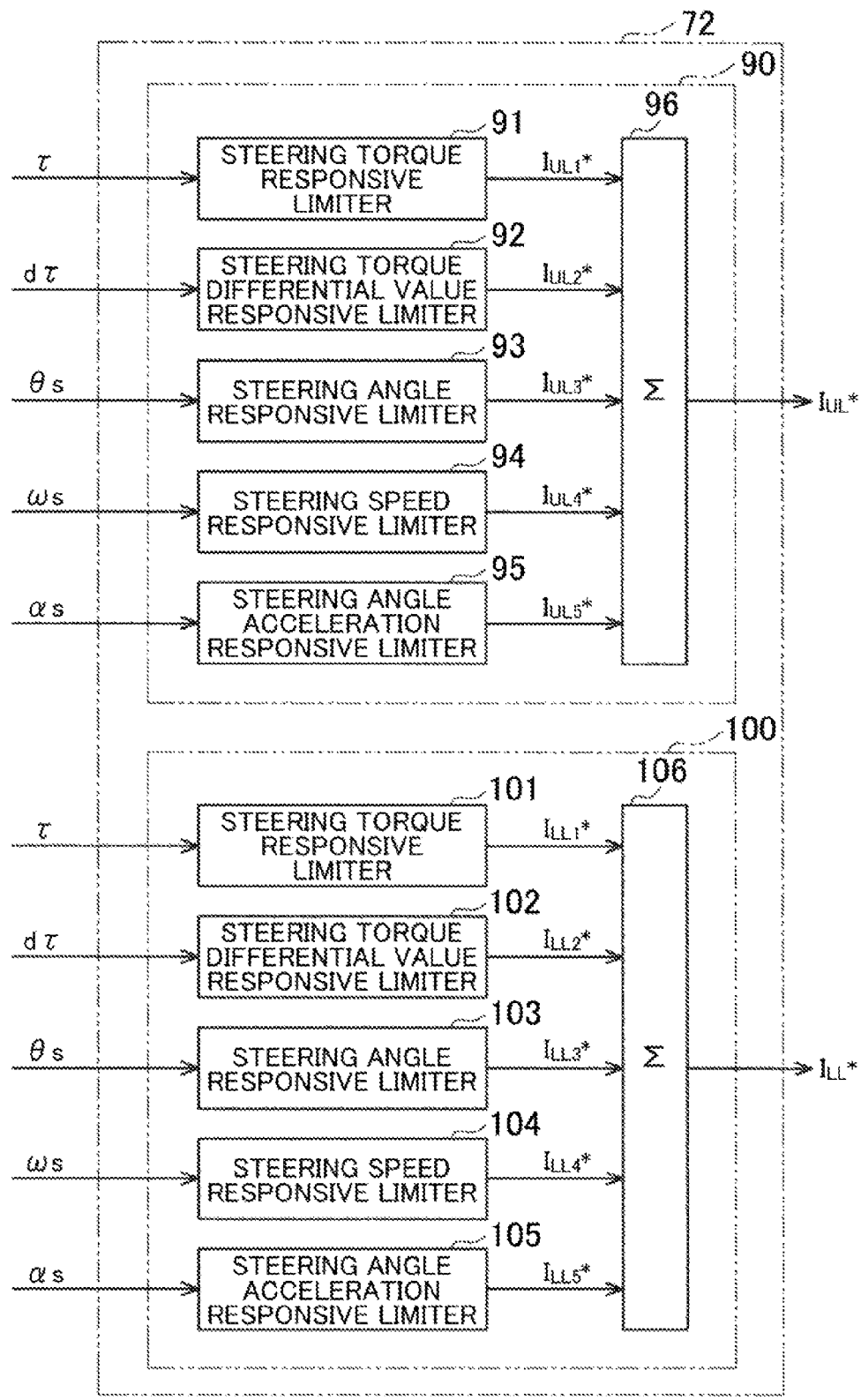
FIG. 4 is a control block diagram of an upper and lower limit calculation part according to the first embodiment.

Next, a description will be given in detail of the upper and lower limit calculation part 72. As shown in FIG. 4, the upper and lower limit calculation part 72 has an upper limit calculation portion 90 and a lower limit calculation portion 100.

The upper limit calculation portion 90 has a steering torque responsive limiter 91, a steering torque differential value responsive limiter 92, a steering angle responsive limiter 93, a steering speed responsive limiter 94, a steering angle acceleration responsive limiter 95, and an adder 96.

The steering torque responsive limiter 91 calculates an upper limit $I_{UL1}^*$ on an assist controlled variable $I_{as}^*$ according to a steering torque τ. The steering torque differential value responsive limiter 92 calculates an upper limit $I_{UL2}^*$ on an assist controlled variable $I_{as}^*$ according to a steering torque differential value dτ. The steering angle responsive limiter 93 calculates an upper limit $I_{UL3}^*$ on an assist controlled variable $I_{as}^*$ according to a steering angle θs. The steering speed responsive limiter 94 calculates an upper limit $I_{UL4}^*$ on an assist controlled variable $I_{as}^*$ according to a steering speed ωs. The steering angle acceleration responsive limiter 95 calculates an upper limit $I_{UL5}^*$ on an assist controlled variable $I_{as}^*$ according to a steering angle acceleration αs.

The adder 96 adds up five upper limits $I_{UL1}^*$ to $I_{UL5}^*$ to generate an upper limit $I_{UL}^*$ on an assist controlled variable $I_{as}^*$. The lower limit calculation portion 100 has a steering torque responsive limiter 101, a steering torque differential value responsive limiter 102, a steering angle responsive limiter 103, a steering speed responsive limiter 104, a steering angle acceleration responsive limiter 105, and an adder 106.

The steering torque responsive limiter 101 calculates a lower limit $I_{LL1}^*$ on an assist controlled variable $I_{as}^*$ according to a steering torque τ. The steering torque differential value responsive limiter 102 calculates a lower limit $I_{LL2}^*$ on an assist controlled variable $I_{as}^*$ according to a steering torque differential value Dτ. The steering angle responsive limiter 103 calculates a lower limit $I_{LL3}^*$ on an assist controlled variable $I_{as}^*$ according to a steering angle θs. The steering speed responsive limiter 104 calculates a lower limit $I_{LL4}^*$ on an assist controlled variable $I_{as}^*$ according to a steering speed ωs. The steering angle acceleration responsive limiter 105 calculates a lower limit $I_{LL5}^*$ on an assist controlled variable $I_{as}^*$ according to a steering angle acceleration αs.

The adder 106 adds up five lower limits $I_{LL1}^*$ to $I_{LL5}^*$ to generate a lower limit $I_{LL}^*$ on an assist controlled variable $I_{as}^*$. Each of the upper limit calculation portion 90 and the lower limit calculation portion 100 calculates respective upper limits $I_{UL1}^*$ to $I_{UL5}^*$ and respective lower limits $I_{LL1}^*$ to $I_{LL5}^*$ using first to fifth limit maps M1 to M5. The first to fifth limit maps M1 to M5 are stored in the storage unit (not shown) of the micro computer 42. The first to fifth limit maps M1 to M5 are set based on the viewpoint that an assist controlled variable $I_{as}^*$ calculated according to the steering operation of a driver is allowed and an abnormal assist controlled variable $I_{as}^*$ due to any reason is not allowed.

Figure 5:
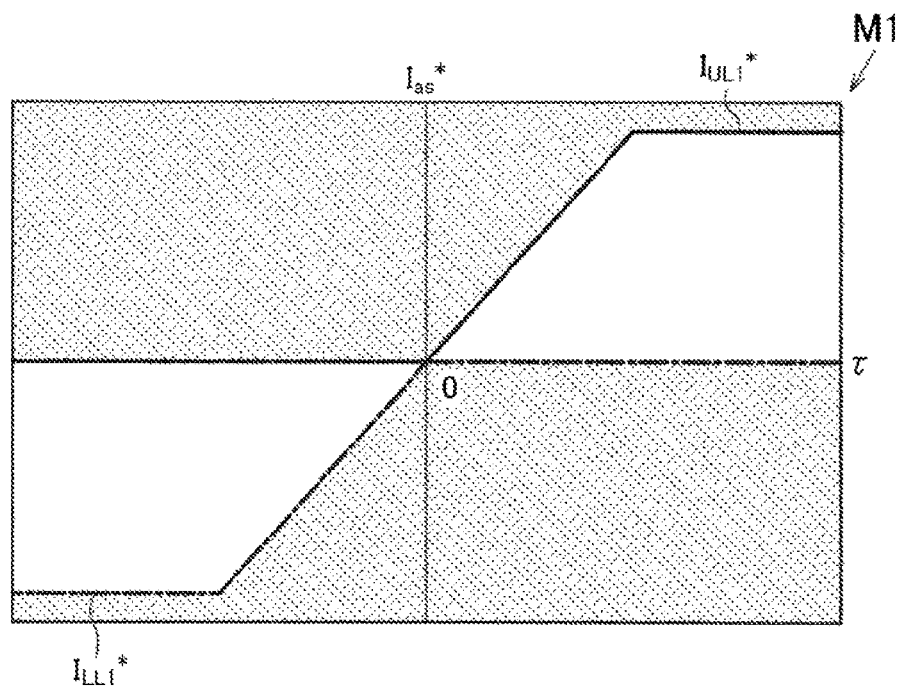
FIG. 5 is a map showing the relationship between steering torques and limit values according to the first embodiment.

As shown in FIG. 5, the first limit map M1 is a map in which a horizontal axis indicates a steering torque τ and a vertical axis indicates an assist controlled variable $I_{as}^*$. The first limit map M1 defines the relationship between a steering torque τ and an upper limit $I_{UL1}^*$ on an assist controlled variable $I_{as}^*$ and the relationship between a steering torque τ and a lower limit $I_{LL1}^*$ on an assist controlled variable $I_{as}^*$. The steering torque responsive limiters 91 and 101 calculate an upper limit $I_{UL1}^*$ and a lower limit $I_{LL1}^*$, respectively, according to a steering torque τ using the first limit map M1.

The first limit map M1 is set based on the viewpoint that an assist controlled variable $I_{as}^*$ in a direction (having a positive or negative sign) the same as that of a steering torque τ is allowed and an assist controlled variable $I_{as}^*$ in a direction different from that of a steering torque τ is not allowed. Thus, the first limit map M1 has the following characteristics. That is, when a steering torque τ is a positive value, an upper limit $I_{UL1}^*$ on an assist controlled variable $I_{as}^*$ increases in a positive direction with an increase in the steering torque τ and remains at a positive constant value with a prescribed value as a boundary. In addition, when a steering torque τ is a positive value, a lower limit $I_{LL1}^*$ of an assist controlled variable $I_{as}^*$ remains at zero. On the other hand, when a steering torque τ is a negative value, an upper limit $I_{UL1}^*$ on an assist controlled variable $I_{as}^*$ remains at zero. In addition, when a steering torque τ is a negative value, a lower limit $I_{LL1}^*$ on an assist controlled variable $I_{as}^*$ increases in a negative direction with an increase in the absolute value of the steering torque τ and remains at a negative constant value with a prescribed value as a boundary.

Figure 6:
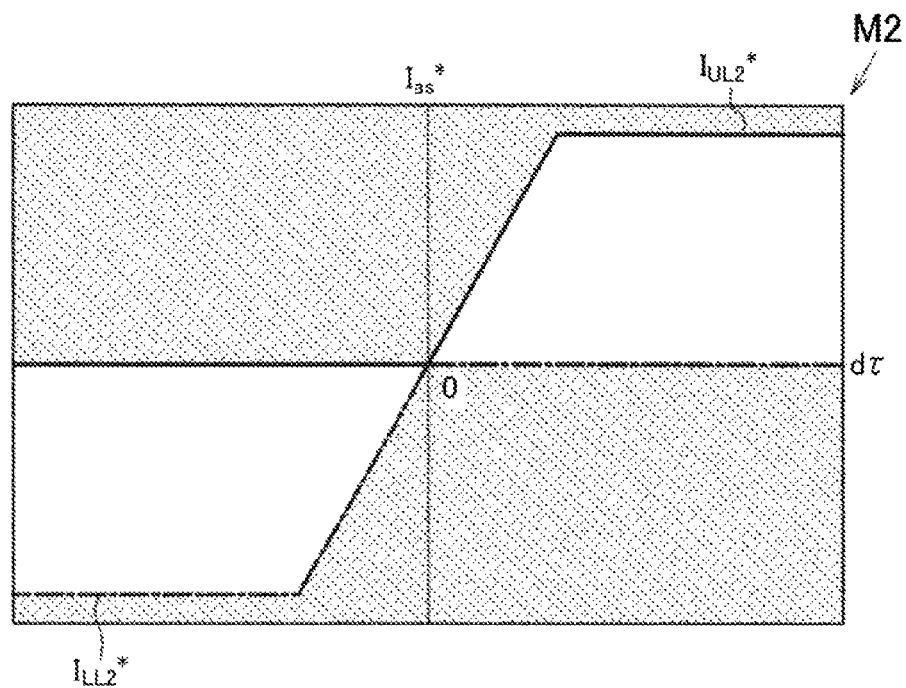
FIG. 6 is a map showing the relationship between the differential values of steering torques and limit values according to the first embodiment.

As shown in FIG. 6, the second limit map M2 is a map in which a horizontal axis indicates a steering torque differential value dr and a vertical axis indicates an assist controlled variable $I_{as}^*$. The second limit map M2 defines the relationship between a steering torque differential value dτ and an upper limit $I_{UL2}^*$ on an assist controlled variable $I_{as}^*$ and the relationship between a steering torque differential value dτ and a lower limit $I_{LL2}^*$ on an assist controlled variable $I_{as}^*$. Each of the steering torque differential value responsive limiters 92 and 102 calculates an upper limit $I_{UL2}^*$ and a lower limit $I_{LL2}^*$ according to a steering torque differential value dτ using the second limit map M2.

The second limit map M2 is set based on the viewpoint that an assist controlled variable $I_{as}^*$ in a direction (having a positive or negative sign) the same as that of a steering torque differential value dτ is allowed and an assist controlled variable $I_{as}^*$ in a direction different from that of a steering torque differential value dτ is not allowed. Thus, the second limit map M2 has the following characteristics. That is, when a steering torque differential value dτ is a positive value, an upper limit $I_{UL2}^*$ on an assist controlled variable $I_{as}^*$ increases in a positive direction with an increase in the steering torque differential value dτ and remains at a positive constant value with a prescribed value as a boundary. In addition, when a steering torque differential value dτ is a positive value, a lower limit $I_{LL2}^*$ on an assist controlled variable $I_{as}^*$ remains at zero. On the other hand, when a steering torque differential value cτ is a negative value, an upper limit $I_{UL2}^*$ on an assist controlled variable $I_{as}^*$ remains at zero. In addition, when a steering torque differential value dτ is a negative value, a lower limit $I_{LL2}^*$ on an assist controlled variable $I_{as}^*$ increases in a negative direction with an increase in the absolute value of the steering torque differential value dτ and remains at a negative constant value with a prescribed value as a boundary.

Figure 7:
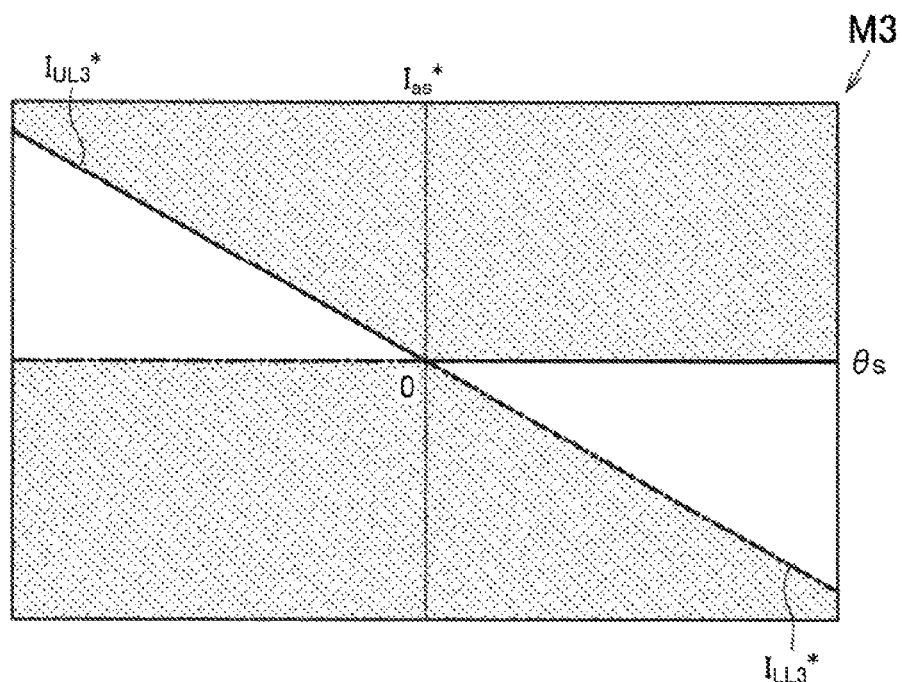
FIG. 7 is a map showing the relationship between steering angles and limit values according to the first embodiment.

As shown in FIG. 7, the third limit map M3 is a map in which a horizontal axis indicates a steering angle θs and a vertical axis indicates an assist controlled variable $I_{as}^*$. The third limit map M3 defines the relationship between a steering angle θs and an upper limit $I_{UL3}^*$ on an assist controlled variable $I_{as}^*$ and the relationship between a steering angle θs and a lower limit $I_{LL3}^*$ on an assist controlled variable $I_{as}^*$. The steering angle responsive limiters 93 and 103 calculate an upper limit $I_{UL3}^*$ and a lower limit $I_{LL3}{}^*$, respectively, according to a steering angle θs using the third limit map M3.

The third limit map M3 is set based on the viewpoint that an assist controlled variable $I_{as}{}^*$ in a direction (having a positive or negative sign) opposite to that of a steering angle θs is allowed and an assist controlled variable $I_{as}{}^*$ in a direction the same as that of a steering angle θs is not allowed. Thus, the third limit map M3 has the following characteristics. That is, when a steering angle θs is a positive value, an upper limit $I_{UL3}{}^*$ on an assist controlled variable $I_{as}{}^*$ remains at zero. In addition, when a steering angle θs is a positive value, a lower limit $I_{LL3}{}^*$ on an assist controlled variable $I_{as}{}^*$ increases in a negative direction with an increase in the steering angle θs. On the other hand, when a steering angle θs is a negative value, an upper limit $I_{UL3}{}^*$ on an assist controlled variable $I_{as}{}^*$ increases in a positive direction with an increase in the absolute value of the steering angle θs. In addition, when a steering angle θs is a negative value, a lower limit $I_{LL3}{}^*$ on an assist controlled variable $I_{as}{}^*$ remains at zero.

Figure 8:
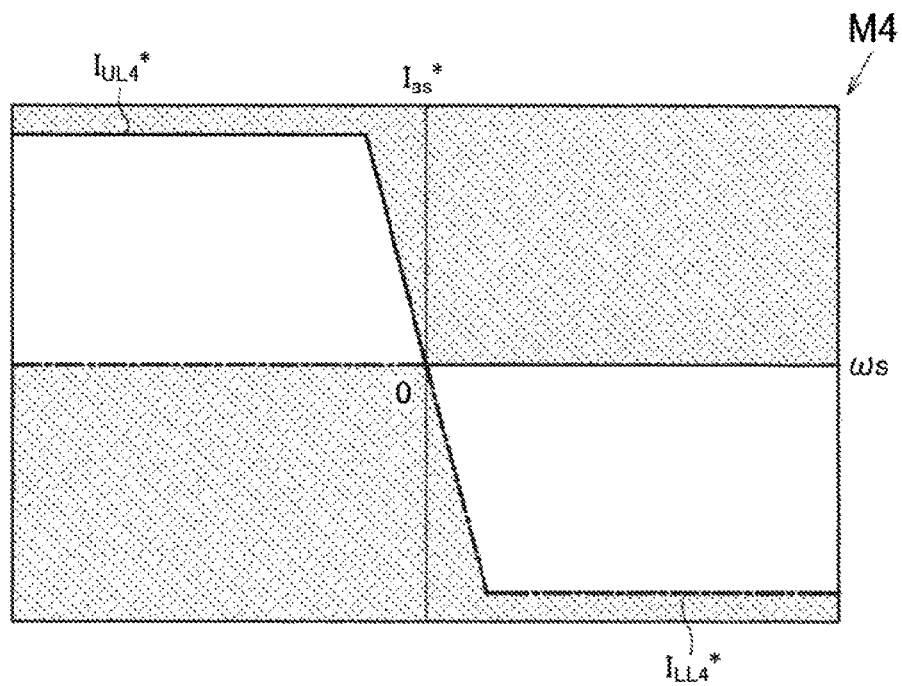
FIG. 8 is a map showing the relationship between steering speeds and limit values according to the first embodiment.

As shown in FIG. 8, the fourth limit map M4 is a map in which a horizontal axis indicates a steering speed ωs and a vertical axis indicates an assist controlled variable $I_{as}{}^*$. The fourth limit map M4 defines the relationship between a steering speed ωs and an upper limit $I_{Um}{}^*$ on an assist controlled variable $I_{as}{}^*$ and the relationship between a steering speed ωs and a lower limit $I_{LL4}{}^*$ on an assist controlled variable $I_{as}{}^*$. The steering speed responsive limiters 94 and 104 calculate an upper limit $I_{UL4}{}^*$ and a lower limit $I_{LL4}{}^*$, respectively, according to a steering speed ωs using the fourth limit map M4.

The fourth limit map M4 is set based on the viewpoint that an assist controlled variable $I_{as}{}^*$ in a direction (having a positive or negative sign) opposite to that of a steering speed ωs is allowed and an assist controlled variable $I_{as}{}^*$ in a direction the same as that of a steering speed ωs is not allowed. Thus, the fourth limit map M4 has the following characteristics. That is, when a steering speed ωs is a positive value, an upper limit $I_{UL4}{}^*$ on an assist controlled variable $I_{as}{}^*$ remains at zero. In addition, when a steering speed ωs is a positive value, a lower limit $I_{LL4}{}^*$ on an assist controlled variable $I_{as}{}^*$ increases in a negative direction with an increase in the steering speed ωs and remains at a negative constant value with a prescribed value as a boundary. On the other hand, when a steering speed ωs is a negative value, an upper limit $I_{UL4}{}^*$ on an assist controlled variable $I_{as}{}^*$ increases in a positive direction with an increase in the absolute value of the steering speed ωs and remains at a positive constant value with a prescribed value as a boundary. In addition, when a steering speed ωs is a negative value, a lower limit $I_{LL4}{}^*$ on an assist controlled variable $I_{as}{}^*$ remains at zero.

Figure 9:
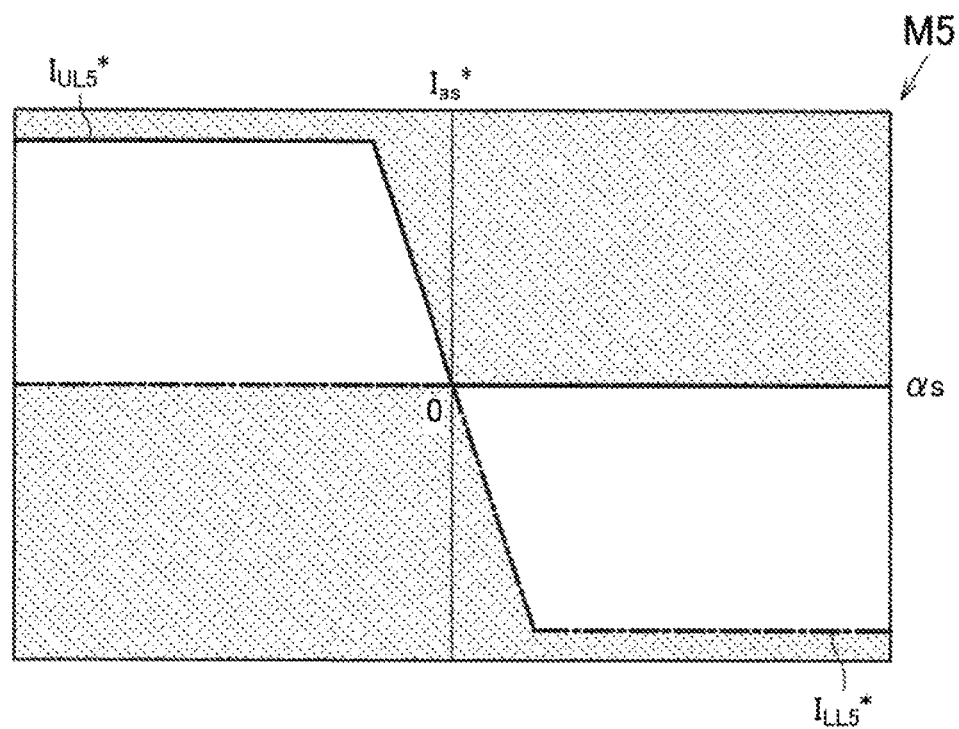
FIG. 9 is a map showing the relationship between steering angle accelerations and limit values according to the first embodiment.

As shown in FIG. 9, the fifth limit map M5 is a map in which a horizontal axis indicates a steering angle acceleration αs and a vertical axis indicates an assist controlled variable $I_{as}{}^*$. The fifth limit map M5 defines the relationship between a steering angle acceleration αs and an upper limit $I_{UL5}{}^*$ on an assist controlled variable $I_{as}{}^*$ and the relationship between a steering angle acceleration αs and a lower limit $I_{LL5}{}^*$ on an assist controlled variable $I_{as}{}^*$. The steering angle acceleration responsive limiters 95 and 105 calculate an upper limit $I_{UL5}{}^*$ and a lower limit $I_{LL5}{}^*$, respectively, according to a steering angle acceleration αs using the fifth limit map M5.

The fifth limit map M5 is set based on the viewpoint that an assist controlled variable $I_{as}{}^*$ in a direction (having a positive or negative sign) opposite to that of a steering angle acceleration αs is allowed and an assist controlled variable $I_{as}{}^*$ in a direction the same as that of a steering angle acceleration αs is not allowed. Thus, the fifth limit map M5 has the following characteristics. That is, when a steering angle acceleration αs is a positive value, an upper limit $I_{UL5}{}^*$ on an assist controlled variable $I_{as}{}^*$ remains at zero. In addition, when a steering angle acceleration αs is a positive value, a lower limit $I_{LL5}{}^*$ of an assist controlled variable $I_{as}{}^*$ increases in a negative direction with an increase in the steering angle acceleration αs and remains at a negative constant value with a prescribed value as a boundary. On the other hand, when a steering angle acceleration αs is a negative value, an upper limit $I_{UL5}{}^*$ on an assist controlled variable $I_{as}{}^*$ increases in a positive direction with an increase in the absolute value of the steering angle acceleration αs and remains at a positive constant value with a prescribed value as a boundary. In addition, when a steering angle acceleration αs is a negative value, a lower limit $I_{LL5}{}^*$ on an assist controlled variable $I_{as}{}^*$ remains at zero.

Accordingly, in the EPS apparatus 10, limit values (upper and lower limits) on an assist controlled variable $I_{as}{}^*$ are separately set to respective signals used to calculate the assist controlled variable $I_{as}{}^*$, here, a steering torque τ, a steering torque differential value dτ, a steering angle θs, a steering speed ωs, and a steering angle acceleration αs that are state variables indicating steering statuses. The micro computer 42 sets limit values, which are used to limit the change range of an assist controlled variable $I_{as}{}^*$ according to values of respective signals, to all the signals in calculating a ultimate current command value I* based on an assist controlled variable $I_{as}{}^*$ and sets values obtained by adding up the limit values as ultimate limit values for the assist controlled variable $I_{as}{}^*$. Meanwhile, limit values set to all the signals, eventually, ultimate limit values are set based on the viewpoint that a normal assist controlled variable $I_{as}{}^*$ calculated according to the steering operation of a driver is allowed and an abnormal assist controlled variable $I_{as}{}^*$ due to any reason is limited. For example, the micro computer 42 allows compensation amounts due to various compensation control such as torque differentiation control and steering return control in response to steering input by a driver but limits abnormal output or false output exceeding the values of the respective compensation amounts.

When an assist controlled variable $I_{as}{}^*$ exceeds a limitation range set by ultimate upper and lower limits $I_{UL}{}^*$ and $I_{LL}{}^*$, the micro computer 42 prevents the assist controlled variable $I_{as}{}^*$ exceeding the upper limit $I_{UL}{}^*$ or the assist controlled variable $I_{as}{}^*$ falling below the lower limit $I_{LL}{}^*$ from being supplied to the motor control signal generation section 62 as a ultimate current command value I*. The ultimate upper and lower limits $I_{UL}{}^*$ and $I_{LL}{}^*$ reflect separate limit values (upper and lower limits) set to all the signals. That is, even when an assist controlled variable $I_{as}{}^*$ indicating an abnormal value is calculated, a value of the abnormal assist controlled variable $I_{as}{}^*$ is limited by ultimate limit values to an appropriate value according to respective signal values. Then, when the appropriate assist controlled variable $I_{as}{}^*$ is supplied to the motor control signal generation section 62 as a ultimate current command value I*, an appropriate assist force is applied to a steering system. Since an abnormal assist controlled variable $I_{as}{}^*$ is prevented from being supplied to the motor control signal generation section 62 as a ultimate current command value I*, an unintended assist force is prevented from being applied to the steering system. For example, so-called self-steering or the like is prevented from occurring.

In addition, appropriate limit values for an assist controlled variable $I_{as}*$ are separately set based on respective signals used to calculate the assist controlled variable $I_{as}*$. Therefore, compared with a case in which limit values for an assist controlled variable $I_{as}*$ are set based on only a steering torque $\tau$ that is a signal used to calculate a basic assist controlled variable $I_1*$, more precise limitation processing is performed on the assist controlled variable $I_{as}*$. There is no need to consider influence on various compensation amounts $I_2*$, $I_3*$, $I_4*$, and $I_5*$ in the setting of the limit values of an assist controlled variable $I_{as}*$.

Here, it is possible to limit an assist controlled variable $I_{as}*$ so long as the abnormality of the assist controlled variable $I_{as}*$ continues, but the following processing may be performed to further enhance safety.

Figure 10:
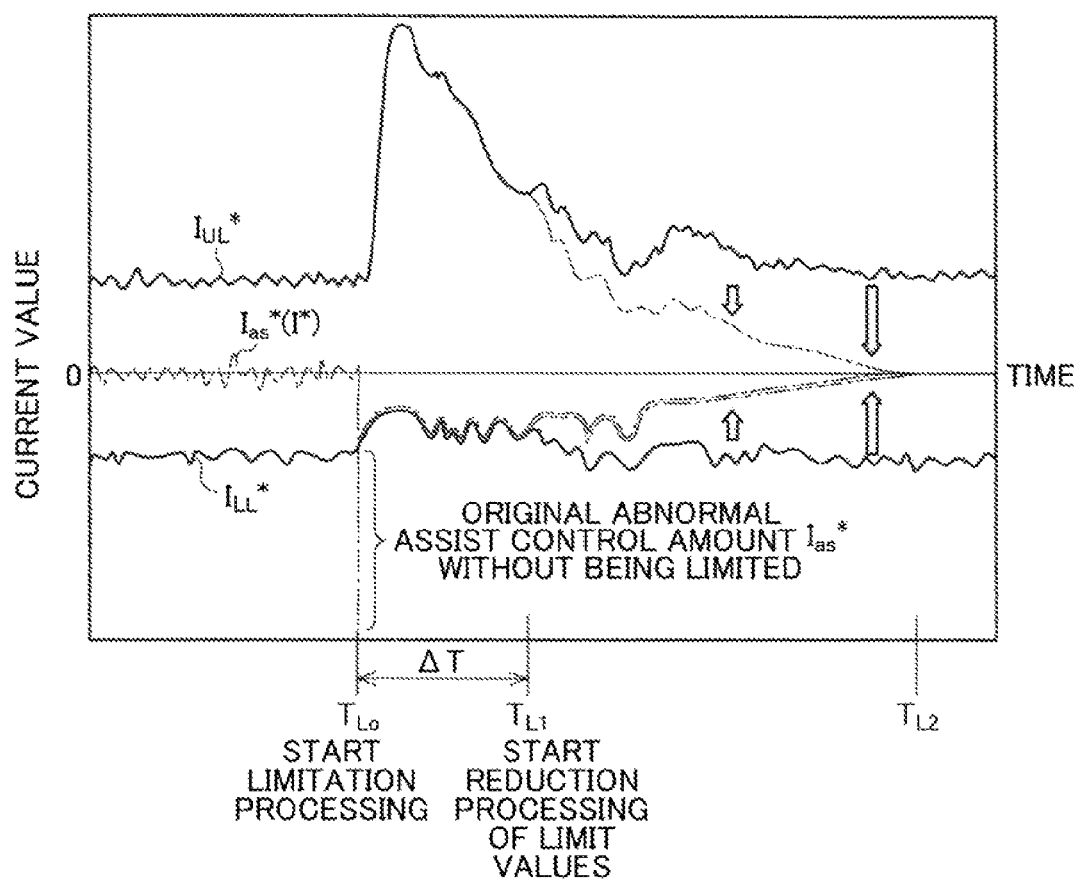
FIG. 10 is a graph showing a change in an assist controlled variable (current command value) according to the first embodiment.

As shown in the graph of FIG. 10, when a value of an assist controlled variable $I_{as}*$ falls below, for example, a lower limit $I_{LL}*$ (time $T_{L0}$), the value of the assist controlled variable $I_{as}*$ is limited to the lower limit $I_{LL}*$. When the limited status continues for a certain period $\Delta$ (time $T_{L1}$), the micro computer 42 gradually decreases the lower limit $I_{LL}*$ toward zero (hereinafter, the processing will be called "gradual decrease processing"). Then, the value of the assist controlled variable $I_{as}*$ becomes zero at the timing (time $T_{L2}$) at which the lower limit $I_{LL}*$ reaches zero. As a result, the application of an assist force to the steering system stops. The gradual decrease processing is performed based on the viewpoint that the application of an assist force preferably stops when an abnormal status continues for a certain period $\Delta T$. Since a value of an assist controlled variable $I_{as}*$ gradually decreases, a sudden change does not occur in steering feelings when an assist stops.

Note that the same applies to a case in which a value of an assist controlled variable $I_{as}*$ exceeds an upper limit $I_{UL}*$. That is, when the limited status of an assist controlled variable $I_{as}*$ continues for a certain period $\Delta T$, the micro computer 42 gradually decreases an upper limit $I_{UL}*$ toward zero.

The gradual decrease processing is forcibly performed regardless of the calculation processing of an upper limit $I_{UL}*$ and a lower limit $I_{LL}*$. The micro computer 42 may stop the gradual decrease processing when a value of an assist controlled variable $I_{as}*$ returns to the normal range between an upper limit $I_{UL}*$ and a lower limit $I_{LL}*$. Thus, an upper limit $I_{UL}*$ or a lower limit $I_{LL}*$ forcibly gradually decreased toward zero returns to its original value.

Here, there is the following concern about the EPS apparatus 10 configured as described above. That is, limit values of an assist controlled variable $I_{as}*$ are separately set to respective state variables ($\tau$, $d\tau$, $\theta s$, $\omega s$, and $\alpha s$) used to calculate the assist controlled variable $I_{as}*$, and values obtained by adding up the limit values are set as ultimate limit values ($I_{UL}*$ and $I_{LL}*$) on the assist controlled variable $I_{as}*$. Then, respective limit values (respective upper limits $I_{UL1}*$ to $I_{UL5}*$ and respective lower limits $I_{LL1}*$ to $I_{LL5}*$) separately set according to respective signals are set regardless of other limit values.

Separately-set respective limit values ($I_{UL1}*$ to $I_{UL5}*$ and $I_{LL1}*$ to $I_{LL5}*$) include respective limit values set based on the viewpoint that an assist in a direction the same as that of a steering torque $\tau$ is allowed and respective limit values set based on the viewpoint that an assist in a direction opposite to that of a steering torque $\tau$ is allowed. Therefore, depending on the tuning of the respective maps, steering conditions, or the like, there is a likelihood that the difference between an assist controlled variable $I_{as}*$ and ultimate limit values (an upper limit $I_{UL}*$ and a lower limit $I_{LL}*$) used to limit the assist controlled variable $I_{as}*$ having a sign opposite to that of the steering torque $\tau$ becomes large. In this case, when an abnormal assist controlled variable $I_{as}*$ having a sign opposite to that of the steering torque $\tau$ is calculated due to any reason, there is a likelihood that the abnormal assist controlled variable $I_{as}*$ is allowed to cause a reverse assist.

More specifically, limit values according to a steering torque $\tau$ are, for example, limit values set based on the viewpoint that an assist in a direction the same as that of the steering torque $\tau$ is allowed, i.e., limit values for an assist controlled variable $I_{as}*$ in a direction in which a load to operate the steering wheel 21 is decreased. The same applies to limit values according to a steering torque differential value $d\tau$. As opposed to this, limit values according to a steering angle $\theta s$ are limit values set based on the viewpoint that an assist in a direction opposite to that of a steering torque $\tau$ is allowed, i.e., limit values for an assist controlled variable $I_{as}*$ in a direction in which a load to operate the steering wheel 21 is increased. The same applies to limit values according to a steering speed $\omega s$ and limit values according to a steering angle acceleration $\alpha s$.

In addition, an assist controlled variable $I_{as}*$ (the sum of a basic assist controlled variable $I_1*$ and a compensation amount $I_4*$) based on a steering torque $\tau$ is used to generate an assist force in a direction (direction the same as that of the steering torque $\tau$) in which a load to operate the steering wheel 21 is decreased. As opposed to this, an assist controlled variable $I_{as}*$ (the sum of respective compensation amounts $I_2*$, $I_3*$, and $I_5*$) based on a steering angle $\theta s$ is used to generate an assist force in a direction (direction opposite to that of a steering torque $\tau$) in which a load to operate the steering wheel 21 is increased.

Therefore, when the absolute value of an assist controlled variable $I_{as}*$ based on a steering torque $\tau$ becomes larger than the absolute value of the assist controlled variable $I_{as}*$ based on a steering angle $\theta s$, a load to operate the steering wheel 21 is decreased. This is because the motor 31 as a whole is controlled based on an assist controlled variable $I_{as}*$ in a direction in which a load to operate the steering wheel 21 is decreased.

Conversely, when the absolute value of an assist controlled variable $I_{as}*$ based on a steering torque $\tau$ is extremely small and the absolute value of the assist controlled variable $I_{as}*$ based on a steering angle $\theta s$ is extremely large, a load to operate the steering wheel 21 is extremely increased. This is because the motor 31 as a whole is controlled based on an assist controlled variable $I_{as}*$ in a direction in which a load to operate the steering wheel 21 is increased.

In normal steering, when an assist in a direction in which a load to operate the steering wheel 21 is increased and an assist in a direction in which the load to operate the steering wheel 21 is decreased are available, it is preferable to perform the assist in which the load to operate the steering wheel 21 is decreased as a whole, i.e., an assist in a direction in which a driver wants to steer.

However, in the EPS apparatus 10, an output range (normal range) of an assist controlled variable $I_{as}*$ based on respective state variables is basically theoretically determined by the first to fifth limit maps M1 to M5. In addition, respective limit values ($I_{UL1}*$ to $I_{UL5}*$ and $I_{LL1}*$ to $I_{LL5}*$) separately set according to respective state variables are set regardless of other limit values. Therefore, depending on the tuning of the respective maps, steering conditions, or the like, respective upper and lower limits are set at larger values. In addition, depending on the combinations of respective limit values, ultimate upper and lower limits $I_{UL}*$ and $I_{LL}*$ are set at larger values.

The larger ultimate upper and lower limits $I_{UL}*$ and $I_{LL}*$, the more the limitation range (normal range) of an assist controlled variable $I_{as}*$ determined by the upper and lower limits $I_{UL}*$ and $I_{LL}*$ extends. Since the range of the value of an allowed assist controlled variable $I_{as}*$ extends with the extension of the limitation range, there is a likelihood that an abnormal assist controlled variable $I_{as}*$ preferably limited by nature is allowed.

In a case in which an assist controlled variable $I_{as}*$ based on a steering torque τ becomes a value close to zero and the assist controlled variable $I_{as}*$ based on a steering angle θs becomes an extremely large value due to any reason when the assist controlled variable $I_{as}*$ is a value falling within a normal range, an assist force in a direction opposite to a steering direction intended by a driver is applied. In this case, since a load to operate the steering wheel 21 is extremely increased, it is naturally preferable that the assist controlled variable $I_{as}*$ at this time is detected as being abnormal. However, according to a current method for setting limit values, the assist controlled variable $I_{as}*$ at this time is a value falling within a normal range. Therefore, it is hard to detect the assist controlled variable $I_{as}*$ at this time as being abnormal.

In view of the above problem, this example employs the following configurations to prevent the extension of ultimate limit values (upper and lower limits $I_{UL}*$ and $I_{LL}*$), particularly the extension of limit values for an assist controlled variable $I_{as}*$ in a direction in which a load to operate the steering wheel 21 is increased.

Figure 11:
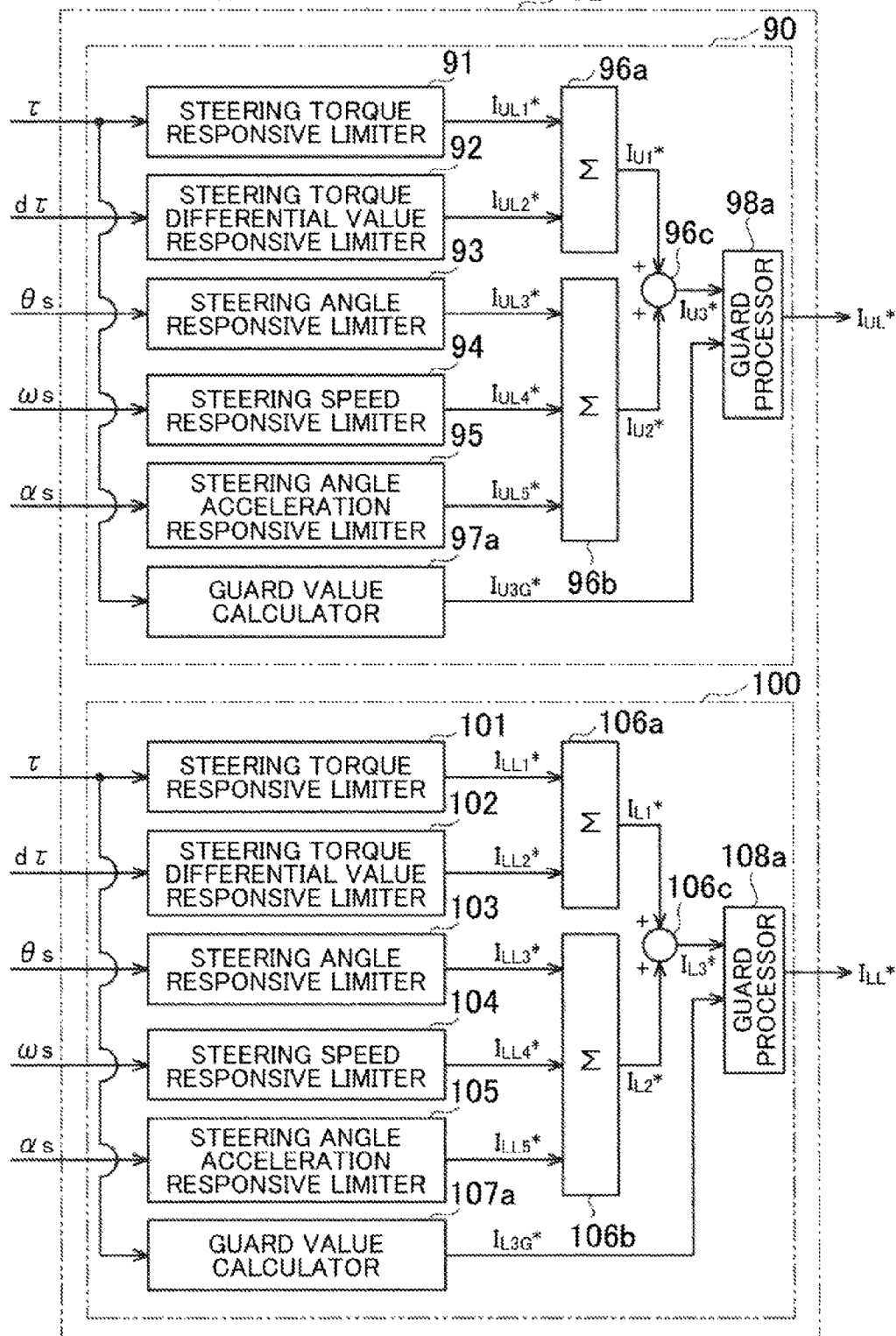
FIG. 11 is a control block diagram of the upper and lower limit calculation part according to the first embodiment.

As shown in FIG. 11, the upper limit calculation portion 90 has a guard value calculator 97a and a guard processor 98a in addition to the respective responsive limiters 91 to 95. In addition, the upper limit calculation portion 90 has three adders 96a, 96b, and 96c instead of the adder 96.

The adder 96a adds an upper limit $I_{UL1}*$ according to a steering torque and an upper limit $I_{UL2}*$ according to a steering torque differential value dτ together. These upper limits $I_{UL1}*$ and $I_{UL2}*$ are each set based on the viewpoint that an assist in a direction the same as that of a steering torque τ is allowed and are limit values for an assist controlled variable $I_{as}*$ in a direction in which a load to operate the steering wheel 21 is decreased.

The adder 96b adds an upper limit $I_{UL3}*$ according to a steering angle θs, an upper limit $I_{UL4}*$ according to a steering speed ωs, and an upper limit $I_{UL5}*$ according to a steering angle acceleration αs together. These upper limits $I_{UL3}*$, $I_{UL4}*$, and $I_{UL5}*$ are each set based on the viewpoint that an assist in a direction opposite to that of a steering torque τ is allowed and are limit values for an assist controlled variable $I_{as}*$ in a direction in which a load to operate the steering wheel 21 is increased.

The adder 96c adds an added value $I_{U1}*$ calculated by the adder 96a and an added value $I_{U2}*$ calculated by the adder 96b together. The guard value calculator 97a acquires a steering torque τ and calculates a guard value $I_{U3G}*$ on an added value $I_{U3}*$ calculated by the adder 96c based on the acquired steering torque τ.

The guard processor 98a performs limitation processing on an added value $I_{U3}*$ calculated by the adder 96c based on a guard value $I_{U3G}*$ calculated by the guard value calculator 97a. That is, the guard processor 98a compares an added value $I_{U3}*$ with a guard value $I_{U3G}*$. When an added value $I_{U3}*$ exceeds a guard value $I_{U3G}*$ in a direction opposite to that of a steering torque τ, the guard processor 98a limits the added value $I_{U3}*$ to the guard value $I_{U3G}*$. An added value $I_{U3}*$ subjected to the guard processing becomes a ultimate upper limit $I_{UL}*$ on an assist controlled variable $I_{as}*$. Note that when an added value $I_{U3}*$ is a value equal to or less than a guard value $I_{U3G}*$, the added value $I_{U3}*$ by the adder 96c directly becomes a ultimate upper limit $I_{UL}*$ on an assist controlled variable $I_{as}*$.

As shown in FIG. 11, the lower limit calculation portion 100 has the same configuration as that of the upper limit calculation portion 90. That is, the lower limit calculation portion 100 has a guard value calculator 107a and a guard processor 108a. In addition, the lower limit calculation portion 100 has three adders 106a, 106b, and 106c instead of the adder 106.

The adder 106a adds a lower limit $I_{LL1}*$ according to a steering torque τ and a lower limit $I_{LL2}*$ according to a steering torque differential value dτ together. These lower limits $I_{LL1}*$ and $I_{LL2}*$ are each set based on the viewpoint that an assist in a direction the same as that of a steering torque τ is allowed and are limit values for an assist controlled variable $I_{as}*$ in a direction in which a load to operate the steering wheel 21 is decreased.

The adder 106b adds a lower limit $I_{LL3}*$ according to a steering angle θs, a lower limit $I_{LL4}*$ according to a steering speed ωs, and a lower limit $I_{LL5}*$ according to a steering angle acceleration αs together. These lower limits $I_{LL3}*$, $I_{LL4}*$, and $I_{LL5}*$ are each set based on the viewpoint that an assist in a direction opposite to that of a steering torque τ is allowed and are limit values for an assist controlled variable $I_{as}*$ in a direction in which a load to operate the steering wheel 21 is increased.

The adder 106c adds up an added value $I_{L1}*$ calculated by the adder 106a and an added value $I_{L2}*$ calculated by the adder 106b. The guard value calculator 107a acquires a steering torque τ and calculates a guard value $I_{L3G}*$ on an added value $I_{L3}*$ calculated by the adder 106c based on the acquired steering torque τ.

The guard processor 108a performs limitation processing on an added value $I_{L3}*$ calculated by the adder 106c based on a guard value $I_{L3G}*$ calculated by the guard value calculator 107a. That is, the guard processor 108a compares an added value $I_{L3}*$ with a guard value $I_{L3G}*$. When an added value $I_{L3}*$ exceeds a guard value $I_{L3G}*$ in a direction opposite to that of a steering torque τ, the guard processor 108a limits the added value $I_{L3}*$ to the guard value $I_{L3G}*$. An added value $I_{L3}*$ subjected to the guard processing becomes a ultimate lower limit $I_{LL}*$ on an assist controlled variable $I_{as}*$. Note that when an added value $I_{L3}*$ is a value equal to or less than a guard value $I_{L3G}*$, an added value $I_{L3}*$ by the adder 106c directly becomes a ultimate lower limit $I_{LL}*$ on an assist controlled variable $I_{as}*$.

The two guard value calculators 97a and 107a respectively calculate guard values $I_{U3G}*$ and $I_{L3G}*$ on added values $I_{U3}*$ and $I_{L3}*$ using a guard map M6. The guard map M6 is stored in the storage unit (not shown) of the micro computer 42.

From the viewpoint of assisting steering, the steering is preferably assisted such that a steering torque τ becomes a certain value or less when an assist controlled variable $I_{as}*$ in a direction in which a load to operate the steering wheel 21 is decreased and an assist controlled variable $I_{as}*$ in a direction in which the load to operate the steering wheel 21 is increased are summed up. Ultimate limit values are also preferably set in a direction in which a load to operate the steering wheel 21 is decreased as a whole. Therefore, the guard map M6 is set based on the viewpoint that an assist in a direction in which the intention of a driver is hindered, i.e., an assist in a direction opposite to that of a steering torque τ is limited.

As shown in FIG. 12, the guard map M6 is a map in which a horizontal axis indicates a steering torque τ and a vertical axis indicates an assist controlled variable $I_{as}^*$. The guard map M6 defines the relationship between a steering torque τ and a guard value $I_{U3G}^*$ on an added value $I_{U3}^*$ and the relationship between a steering torque τ and a guard value $I_{L3G}^*$ on an added value $I_{L3}^*$.

The guard map M6 has the following characteristics. That is, when a steering torque τ is a positive value, a guard value $I_{U3G}^*$ remains at a negative constant value until the steering torque τ reaches a first setting value +τ1 from zero. After the steering torque τ reaches the first setting value +τ1, the guard value $I_{U3G}^*$ suddenly increases in a positive direction and then remains at a positive constant value that is a value near zero. In addition, when a steering torque τ is a positive value, a guard value $I_{L3G}^*$ remains at a positive constant value. On the other hand, when a steering torque τ is a negative value, a guard value $I_{U3G}^*$ remains at a negative constant value. In addition, when a steering torque τ is a negative value, a guard value $I_{L3G}^*$ remains at a positive constant value until the steering torque τ reaches a second setting value −τ1 from zero. After the steering torque τ reaches the second setting value −τ1, the guard value $I_{L3G}^*$ suddenly decreases in a negative direction and remains at a negative constant value that is a value near zero. According to the guard map M6, when the absolute value of a steering torque τ exceeds the absolute values of the first and second setting values +τ1 and −τ1, an assist controlled variable $I_{as}^*$ in a direction opposite to that of the steering torque τ is limited to a constant value near zero in a direction the same as that of the steering torque τ.

By the way, first and second setting values +τ1 and −τ1 are set for the following reason. That is, since the limitation range (normal range) of an assist controlled variable $I_{as}^*$ extends with an increase in a value of a steering torque τ, there is large influence on steering behavior when an abnormal assist controlled variable $I_{as}^*$ is calculated. In other words, since the limitation range (normal range) of an assist controlled variable $I_{as}^*$ narrows with a decrease in a value of a steering torque τ, there is small influence on steering behavior when an abnormal assist controlled variable $I_{as}^*$ is calculated. Therefore, determination is made as to whether the added values $I_{U3}^*$ and $I_{L3}^*$ of the adders 96c and 106c are limited based on first and second setting values +τ1 and −τ1.

For example, with an increase in a value of a steering torque τ, a load to operate the steering wheel 21 is increased when an abnormal assist controlled variable $I_{as}^*$ having a sign opposite to that of the steering torque τ is calculated. Therefore, when a steering torque τ has a size of a certain degree or more, it is preferable to prevent a reverse assist. As opposed to this, with a decrease in a value of a steering torque τ, a degree to which a load to operate the steering wheel 21 is increased when an abnormal assist controlled variable $I_{as}^*$ having a sign opposite to that of the steering torque τ is calculated becomes small. Therefore, when a steering torque τ is a small value, allowing of a reverse assist is not much of a problem.

Further, when added values $I_{U3}^*$ and $I_{L3}^*$ calculated by the adder 96c and 106c are limited using the guard map M6, the following operation is performed.

For example, when an assist controlled variable $I_{as}^*$ in a direction (direction opposite to that of a steering torque τ) in which a load to operate the steering wheel 21 is increased as a whole becomes an extremely large value, the absolute value of the steering torque τ also becomes large as a matter of course due to a difficulty in operating the steering wheel 21. In view of this point, in a state in which a value of a steering torque τ becomes a large value enough to exceed a first setting value +τ1 when the steering torque τ is a positive value, the lower limit of an added value $I_{U3}^*$ of respective upper limits $I_{UL1}^*$ to $I_{UL5}^*$ by the adder 96c is limited to a positive constant value near zero. In addition, in a state in which a value of a steering torque τ becomes a large value enough to exceed a second setting value −τ1 when the steering torque τ is a negative value, the upper limit of an added value $I_{L3}^*$ of respective lower limits $I_{LL1}^*$ to $I_{LL5}^*$ by the adder 106c is limited to a negative constant value near zero.

That is, when the absolute value of a steering torque τ becomes a large value enough to exceed the absolute values of first and second setting values +τ1 and −τ1, ultimate limit values (an upper limit $I_{UL}^*$ or a lower limit $I_{LL}^*$) used to limit an assist controlled variable $I_{as}^*$ having a sign opposite to that of the steering torque τ are limited to constant values near zero in a direction the same as that of the steering torque τ. Therefore, even when an assist controlled variable $I_{as}^*$ in a direction in which a load to operate the steering wheel 21 (in a direction opposite to that of a steering torque τ) is increased as a whole becomes an extremely large value, the assist controlled variable $I_{as}^*$ is limited to a constant value near zero in a direction the same as that of the steering torque τ. That is, an assist controlled variable $I_{as}^*$ necessarily becomes a value in a direction the same as that of a steering torque τ (value having a sign the same as that of steering torque τ). Accordingly, when the absolute value of a steering torque τ becomes a large value enough to exceed the absolute values of first and second setting values +τ1 and −τ1, an assist in a direction opposite to that of the steering torque τ (in a direction in which a load to operate the steering wheel 21 is increased) is limited. Therefore, a driver is allowed to perform steering as he/she wants. In addition, even when an abnormal assist controlled variable $I_{as}^*$ having a sign opposite to that of a steering torque τ is calculated due to any reason, the abnormal assist controlled variable $I_{as}^*$ is limited to a constant value near zero in a direction the same as that of the steering torque τ. In the way described above, so-called a reverse assist is prevented.

Accordingly, the embodiment may obtain the following effects. (1) Limit values of an assist controlled variable $I_{as}^*$ are separately set to respective signals (respective state variables) used to calculate the assist controlled variable $I_{as}^*$, and values obtained by adding up the limit values are set as ultimate limit values for the assist controlled variable $I_{as}^*$. Therefore, even when an assist controlled variable $I_{as}^*$ indicating an abnormal value is calculated due to any reason, the abnormal assist controlled variable $I_{as}^*$ is directly limited to an appropriate value according to respective signal values by ultimate limit values. Thus, since an assist controlled variable $I_{as}^*$ limited to an appropriate value is supplied to the motor control signal generation section 62 as a ultimate current command value $I_{as}^*$, an unintended assist force may be reliably prevented from being applied to the steering system.

(2) The micro computer 42 collectively performs limitation processing on an assist controlled variable $I_{as}^*$ using an upper limit value $I_{UL}^*$ obtained by adding up respective upper limits $I_{UL1}^*$ to $I_{UL5}^*$ and a lower limit value $I_{LL}^*$ obtained by adding up respective lower limits $I_{LL1}^*$ to $I_{LL5}^*$. The micro computer 42 may be configured to separately perform limitation processing on an assist controlled variable $I_{as}^*$ using respective upper limits $I_{UL1}^*$ to $I_{UL5}^*$ and respective lower limits $I_{LL1}^*$ to $I_{LL5}^*$. However, compared with the configuration, it is possible to further decrease a calculation load of the micro computer 42.

(3) The micro computer 42 may easily calculate respective upper limits $I_{UL1}^*$ to $I_{UL5}^*$ and respective lower limits $I_{LL1}^*$ to $I_{LL5}^*$ using the first to fifth limit maps M1 to M5.

(4) When the absolute value of a steering torque τ becomes a large value enough to exceed the absolute values of first and second setting values +τ1 and −τ1, an assist in a direction opposite to that of the steering torque τ is limited. Therefore, a driver is allowed to perform steering as he/she wants. In addition, since the absolute values of ultimate limit values (an upper limit $I_{UL}^*$ or a lower limit $I_{LL}^*$) in a direction opposite to a steering torque τ are limited, a sudden change in steering behavior when an abnormal assist controlled variable $I_{as}^*$ of an assist in a direction opposite to that of the steering torque τ is calculated is prevented. So-called a reverse assist is also prevented.

(5) When a steering torque τ becomes a large value enough to exceed the absolute values of first and second setting values +τ1 and −τ1, an assist controlled variable $I_{as}^*$ in a direction opposite to that of the steering torque τ is limited to a constant value near zero in a direction the same as that of the steering torque τ. Therefore, when a steering torque τ becomes a large value enough to exceed the absolute values of first and second setting values +τ1 and −τ1, an assist controlled variable $I_{as}^*$ necessarily becomes a value in a direction the same as that of the steering torque τ. Accordingly, since an assist in a direction in which a driver wants to steer (in a direction the same as that of a steering torque τ) is performed, the driver is allowed to comfortably perform steering as he/she wants. So-called a reverse assist is also more reliably prevented.

Next, a description will be given of a second embodiment of the EPS apparatus. This example differs from the first embodiment in the configuration of the upper and lower limit calculation part 72 shown in FIG. 11.

Figure 13:
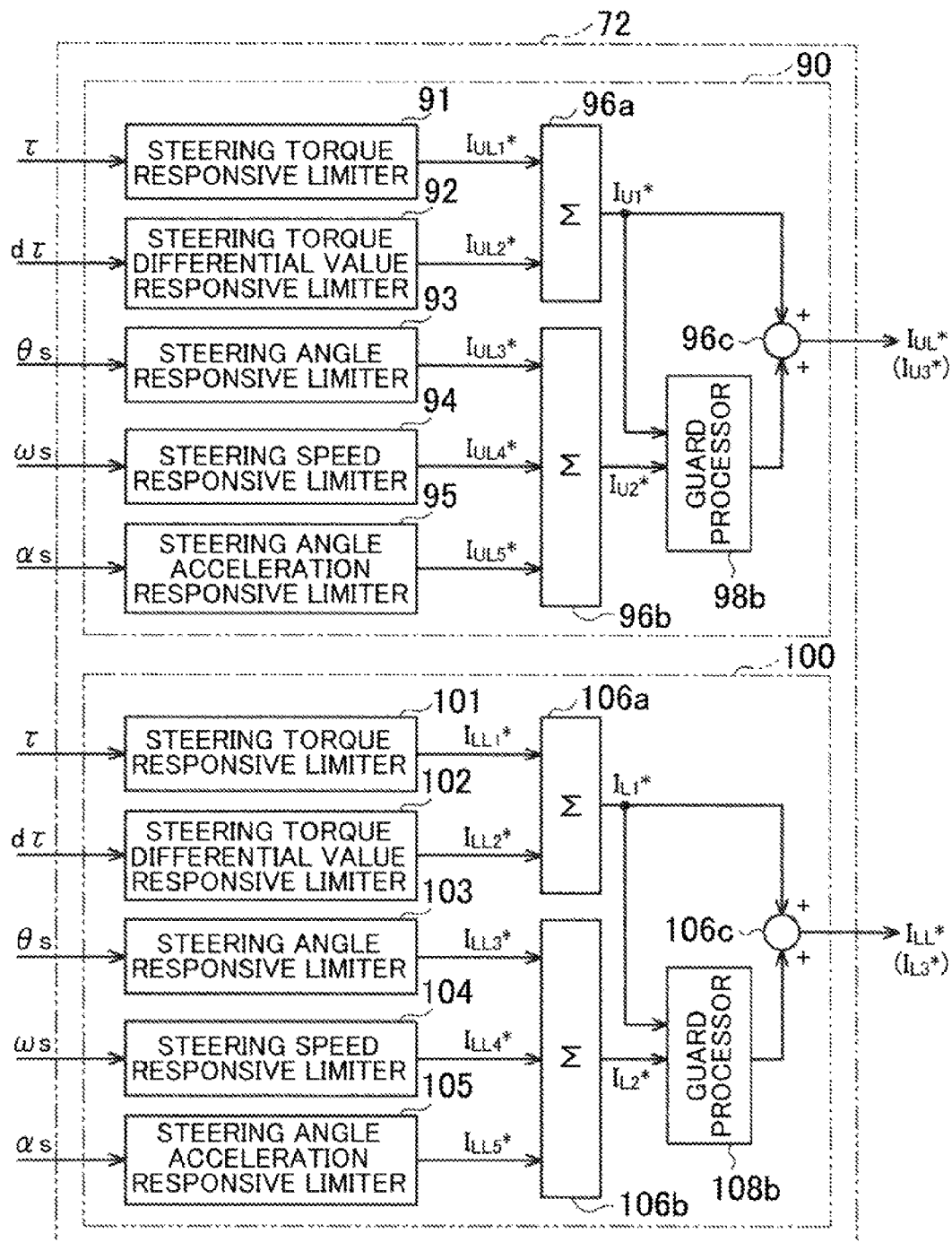
FIG. 13 is a control block diagram of the upper and lower limit control part according to a second embodiment.

As shown in FIG. 13, the upper limit calculation portion 90 has a guard processor 98b. The guard processor 98b acquires an added value $I_{U1}^*$ calculated by the adder 96a and performs limitation processing on an added value $I_{U2}^*$ calculated by the adder 96b according to the acquired added value $I_{U1}^*$. A guard processor 108b of the lower limit calculation portion 100 acquires an added value $I_{L1}^*$ calculated by the adder 106a and performs limitation processing on an added value $I_{L2}^*$ calculated by the adder 106b according to the acquired added value $I_{L1}^*$.

The guard processor 98b performs limitation processing on an added value $I_{U3}^*$ using a guard map $M7_U$ shown in FIG. 14A. The guard processor 108b performs limitation processing on an added value $I_{L3}^*$ using a guard map $M7_L$ shown in FIG. 14B. The two guard maps $M7_U$ and $M7_L$ are stored in the storage unit (not shown) of the micro computer 42.

As shown in FIG. 14A, the guard map $M7_U$ is a map in which a horizontal axis indicates an added value $I_{U1}^*$ calculated by the adder 96a and a vertical axis indicates an assist controlled variable $I_{as}^*$. The guard map $M7_U$ defines the relationship between an added value $I_{U1}^*$ calculated by the adder 96a and a guard value $I_{U2G}^*$ on an added value $I_{U2}^*$ calculated by the adder 96b.

The guard map $M7_U$ has the following characteristics. That is, when an added value $I_{U1}^*$ calculated by the adder 96a is a positive value, a guard value $I_{U2G}^*$ on an added value $I_{U2}^*$ remains at zero. In addition, when an added value $I_{U1}^*$ calculated by the adder 96a is a negative value, a guard value $I_{U2G}^*$ on an added value $I_{U2}^*$ increases in a positive direction with an increase in the added value $I_{U1}^*$ calculated by the adder 96a in a negative direction.

As shown in FIG. 14B, the guard map $M7_L$ is a map in which a horizontal axis indicates an added value $I_{L1}^*$ calculated by the adder 106a and a vertical axis indicates an assist controlled variable $I_{as}^*$. The guard map $M7_L$ defines the relationship between an added value $I_{L1}^*$ calculated by the adder 106a and a guard value $I_{L2G}^*$ on an added value $I_{L2}^*$ calculated by the adder 106b. The guard maps $M7_U$ and $M7_L$ are set based on the viewpoint that the absolute values of the added values $I_{U1}^*$ and $I_{L1}^*$ of respective limit values for an assist controlled variable $I_{as}^*$ in a direction in which a load to operate the steering wheel 21 is increased are prevented from becoming excessive.

The guard map $M7_L$ has the following characteristics. That is, when an added value $I_{L1}^*$ calculated by the adder 106a is a negative value, a guard value $I_{L2G}^*$ on an added value $I_{L2}^*$ remains at zero. In addition, when an added value $I_{L1}^*$ calculated by the adder 106a is a positive value, a guard value $I_{L2G}^*$ on an added value $I_{L2}^*$ increases in a negative direction with an increase in the added value $I_{L1}^*$ calculated by the adder 106a in a positive direction.

Meanwhile, the absolute values of guard values $I_{U2G}^*$ and $I_{L2G}^*$ are preferably set at values smaller than the absolute values of added values $I_{U1}^*$ and $I_{L1}^*$ of respective limit values for an assist controlled variable $I_{as}^*$ in a direction in which a load to operate the steering wheel 21 is decreased (the assist controlled variable having a sign the same as that of a steering torque τ) based on the first to third limit maps M1 to M3.

The guard processor 98b compares an added value $I_{U2}^*$ with a guard value $I_{U2G}^*$. When an added value $I_{U2}^*$ exceeds a guard value $I_{U2G}^*$ in a positive direction, the guard processor 98b limits the added value $I_{U2}^*$ to the guard value $I_{U2G}^*$. When an added value $I_{U2}^*$ subjected to the guard processing and an added value $I_{U1}^*$ calculated by the adder 96a are added together, a ultimate upper limit $I_{UL}^*$ on an assist controlled variable $I_{as}^*$ is generated. Note that when an added value $I_{U2}^*$ is a value of a guard value $I_{U2G}^*$ or less, the added value $I_{U2}^*$ not subjected to the guard processing and an added value $I_{U2}^*$ calculated by the adder 96a are added together to generate a ultimate upper limit $I_{UL}^*$ on an assist controlled variable $I_{as}^*$.

In addition, the guard processor 108b compares an added value $I_{L2}^*$ with a guard value $I_{L2G}^*$. When an added value $I_{L2}^*$ exceeds a guard value $I_{L2G}^*$ in a negative direction, the guard processor 108b limits the added value $I_{L2}^*$ to the guard value $I_{L2G}^*$. When the added value $I_{L2}^*$ subjected to the guard processing and an added value $I_{L1}^*$ calculated by the adder 106a are added together, a ultimate lower limit $I_{LL}^*$ on an assist controlled variable $I_{as}^*$ is generated. Note that when an added value $I_{L2}^*$ is a value of a guard value $I_{L2G}^*$ or less, the added value $I_{L2}^*$ not subjected to the guard processing and an added value $I_{L1}^*$ calculated by the adder 106a are added together to generate a ultimate lower limit $I_{LL}^*$ on an assist controlled variable $I_{as}^*$.

As described above, the absolute values of the added values $I_{U2}^*$ and $I_{L2}^*$ of respective limit values for an assist controlled variable $I_{as}^*$ in a direction in which a load to operate the steering wheel 21 is increased are limited to the absolute values of guard values $I_{U2G}^*$ and $I_{L2G}^*$ or less. Therefore, a value of an assist controlled variable $I_{as}^*$ in a direction in which a load to operate the steering wheel 21 is increased is prevented from becoming excessive. Accordingly, a driver is allowed to easily perform steering as he/she wants. In addition, even when an abnormal assist controlled variable $I_{as}^*$ having a sign opposite to that of a steering torque τ is calculated due to any reason, the allowed range of the abnormal assist controlled variable $I_{as}^*$ narrows, whereby so-called a reverse assist is prevented.

Note that when the absolute values of guard values $I_{U2G}^*$ and $I_{L2G}^*$ are set at values smaller than the absolute values of the added values $I_{U1}^*$ and $I_{L1}^*$ of respective limit values for an assist controlled variable $I_{as}^*$ in a direction in which a load to operate the steering wheel 21 is decreased, the assist controlled variable $I_{as}^*$ finally necessarily becomes a value in a direction in which a load to operate the steering wheel 21 is decreased. Since an assist in a direction in which a driver wants to steer is performed, the driver is allowed to smoothly perform steering as he/she wants.

Accordingly, the embodiment may obtain the following effect in addition to the effects (1) to (3) of the first embodiment.

(6) Added values $I_{U2}^*$ and $I_{L2}^*$ of respective limit values for an assist controlled variable $I_{as}^*$ in a direction in which a load to operate the steering wheel 21 is increased are limited according to added values $I_{U1}^*$ and $I_{L1}^*$ of respective limit values for an assist controlled variable $I_{as}^*$ in a direction in which a load to operate the steering wheel 21 is decreased. Therefore, the allowed range of an assist controlled variable $I_{as}^*$ in a direction in which a load to operate the steering wheel 21 is increased (the assist controlled variable $I_{as}^*$ having a sign opposite to that of a steering torque τ) is prevented from excessively extending. By a degree to which an abnormal assist controlled variable $I_{as}^*$ having a sign opposite to that of a steering torque τ is limited, an assist force applied to a direction opposite to that of the steering torque τ decreases. Therefore, a driver is allowed to easily perform steering as he/she wants.

Next, a description will be given of a third embodiment of the EPS apparatus. This example differs from the second embodiment in the configuration of the upper and lower limit calculation part 72.

Figure 15:
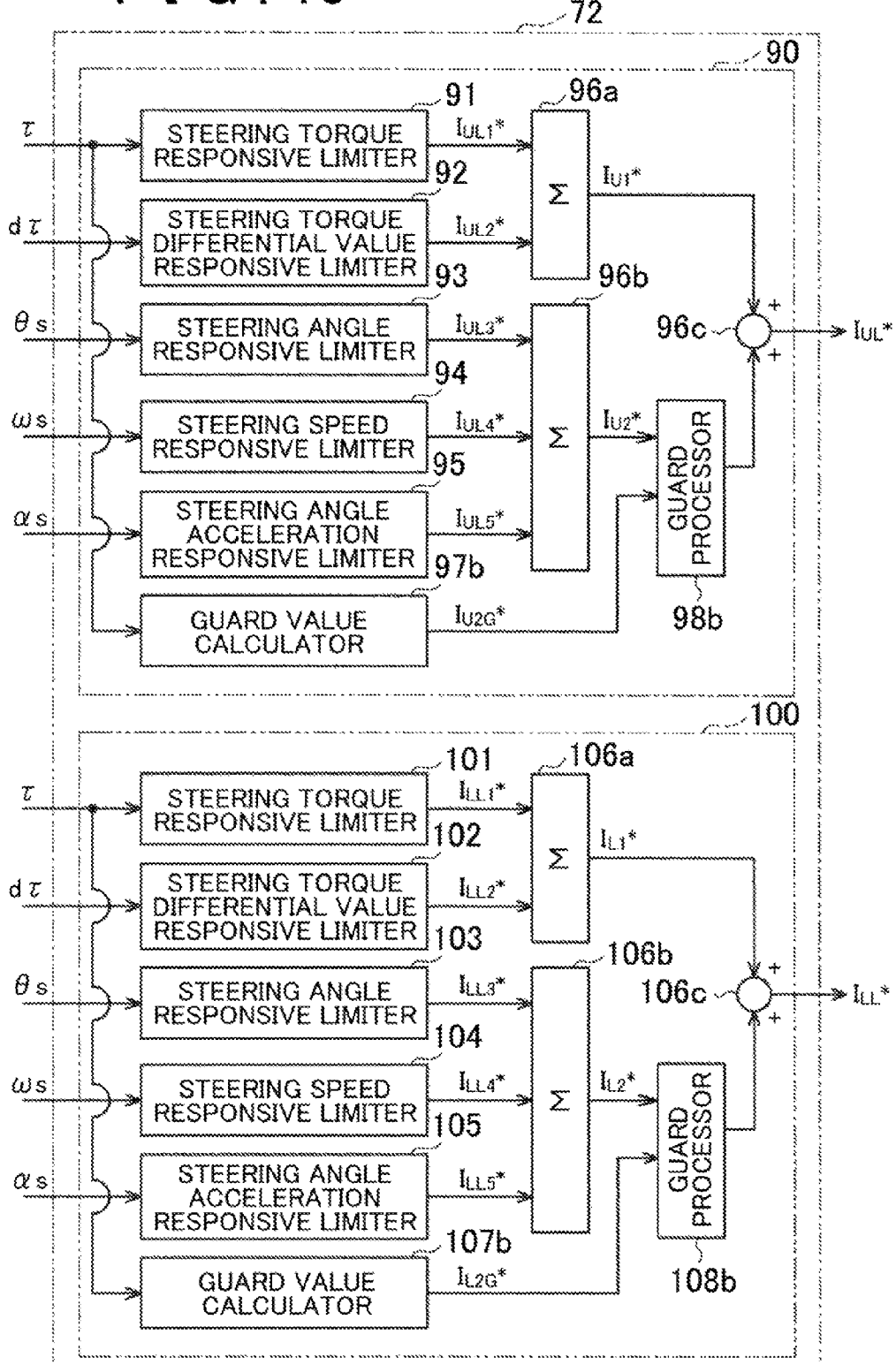
FIG. 15 is a control block diagram of the upper and lower limit calculation part according to a third embodiment.

As shown in FIG. 15, the upper limit calculation portion 90 has a guard value calculator 97b. The guard value calculator 97b acquires a steering torque τ and calculates a guard value $I_{U2G}^*$ on an added value $I_{U2}^*$ calculated by the adder 96b based on the acquired steering torque τ. The guard processor 98b performs limitation processing on an added value $I_{U2}^*$ calculated by the adder 96b based on a guard value $I_{U2G}^*$ calculated by the guard value calculator 97b.

The lower limit calculation portion 100 has a guard value calculator 107b. The guard value calculator 107b acquires a steering torque τ and calculates a guard value $I_{L2G}^*$ on an added value $I_{L2}^*$ calculated by the adder 106b based on the acquired steering torque τ. The guard processor 108b performs limitation processing on an added value $I_{L2}^*$ calculated by the adder 106b based on a guard value $I_{L2G}^*$ calculated by the guard value calculator 107b.

The two guard value calculators 97b and 107b respectively calculate guard values $I_{U2G}^*$ and $I_{L2G}^*$ on added values $I_{U2}^*$ and $I_{L2}^*$ using a guard map M8 shown in FIG. 16. The guard map M8 is stored in the storage unit (not shown) of the micro computer 42. Therefore, the guard map M8 is set based on the viewpoint that an assist in a direction in which the intention of a driver is hindered, i.e., an assist in a direction opposite to that of a steering torque τ is limited.

As shown in FIG. 16, the guard map M8 is a map in which a horizontal axis indicates a steering torque τ and a vertical axis indicates an assist controlled variable $I_{as}^*$. The guard map M8 defines the relationship between a steering torque τ and a guard value $I_{U2G}^*$ on an added value $I_{U2}^*$ and the relationship between a steering torque τ and a guard value $I_{L2G}^*$ on an added value $I_{L2}^*$.

The guard map M8 has the following characteristics. That is, as shown by a solid line in the fourth quadrant of the graph of FIG. 16, a guard value $I_{U2G}^*$ remains at a negative constant value until a steering torque τ reaches a first setting value +τ1 when the steering torque τ is a positive value. After the steering torque τ reaches the first setting value +τ1, the guard value $I_{U2G}^*$ increases in a positive direction with an increase in the steering torque τ and then reaches zero. After that, even when the steering torque τ increases, the guard value $I_{U2G}^*$ remains at zero. In addition, as shown by a chain line in the first quadrant of the graph of FIG. 16, a guard value $I_{L2G}^*$ remains at a positive constant value when a steering torque τ is a positive value.

On the other hand, as shown by a solid line in the third quadrant of FIG. 16, a guard value $I_{U2G}^*$ remains at a negative constant value when the steering torque τ is a negative value. In addition, as shown by a chain line in the second quadrant of FIG. 16, a guard value $I_{L2G}^*$ remains at a positive constant value until a steering torque τ reaches a second setting value −τ1 when the steering torque τ is a negative value. After the steering torque τ reaches the second setting value −τ1, the guard value $I_{L2G}^*$ decreases in a negative direction with an increase in the steering torque τ and then reaches zero. After that, even when the steering torque τ increases, the guard value $I_{L2G}^*$ remains at zero.

According to the guard map M8, when the absolute value of a steering torque τ exceeds the absolute values of first and second setting values +τ1 and −τ1, added values $I_{U2}^*$ and $I_{L2}^*$ of respective limit values used to limit an assist controlled variable $I_{as}^*$ having a sign opposite to that of the steering torque τ are limited. By a degree to which added values $I_{U2}^*$ and $I_{L2}^*$ of respective limit values are limited, ultimate limit values ($I_{UL}^*$ and $I_{LL}^*$) on an assist controlled variable $I_{as}^*$ are prevented from extending in a direction opposite to that of a steering torque ti. In addition, since ultimate limit values ($I_{UL}^*$ and $I_{LL}^*$) on an assist controlled variable $I_{as}^*$ having a sign opposite to that of a steering torque τ are set at zero when added values $I_{U2}^*$ and $I_{L2}^*$ of respective limit values are limited, the assist controlled variable $I_{as}^*$ having the sign opposite to that of the steering torque τ is limited to zero. That is, so-called a reverse assist in a direction opposite to that of a steering torque τ by which the intention of a driver is hindered is prevented.

Accordingly, the embodiment may obtain the same effects as the effects (1) to (4) of the first embodiment. Next, a description will be given of a fourth embodiment of the EPS apparatus. This example differs from the third embodiment in the configuration of the upper and lower limit calculation part 72.

Figure 17:
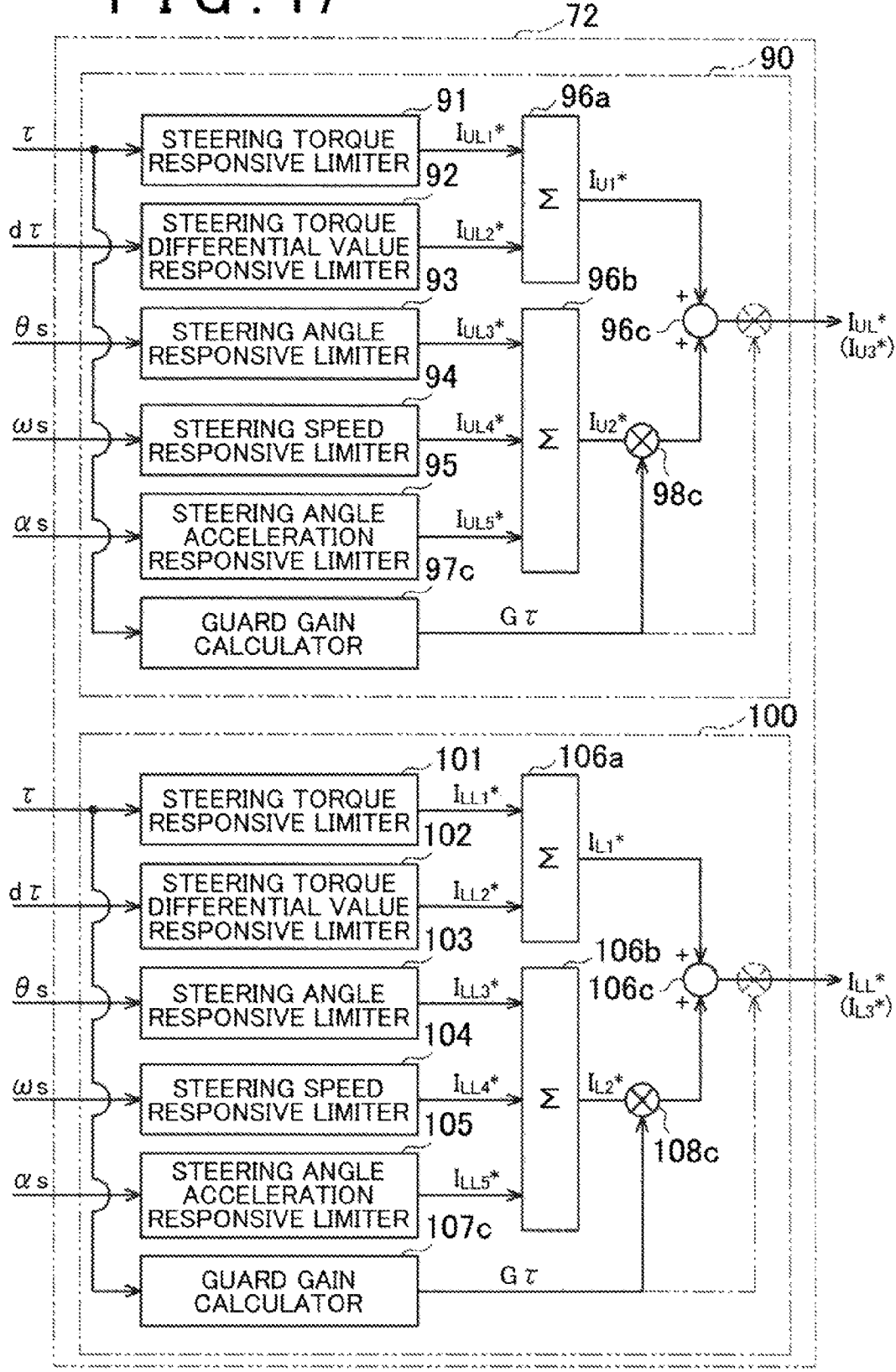
FIG. 17 is a control block diagram of the upper and lower limit calculation part according to a fourth embodiment.

As shown in FIG. 17, the upper limit calculation portion 90 has a torque gain calculator (guard value calculator) 97c and a multiplier (guard processor) 98c. The torque gain calculator 97c acquires a steering torque τ and calculates a torque gain Gτ on an added value $I_{U2}^*$ calculated by the adder 96b based on the acquired steering torque τ. The multiplier 98c multiplies an added value $I_{U2}^*$ calculated by the adder 96b by a torque gain Gτ calculated by the torque gain calculator 97c.

The lower limit calculation portion 100 has a torque gain calculator (guard value calculator) 107c and a multiplier (guard processor) 108c. The torque gain calculator 107c acquires a steering torque τ and calculates a torque gain Gτ on an added value $I_{L2}^*$ calculated by the adder 106b based on the acquired steering torque τ. The multiplier 108c multiplies an added value $I_{L2}^*$ calculated by the adder 106*b* by a torque gain Gτ calculated by the torque gain calculator 107*c*.

Figure 18:
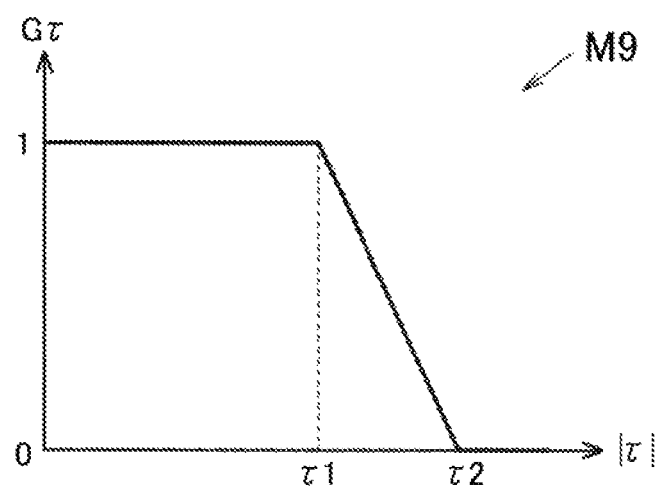
FIG. 18 is a torque gain map according to the fourth embodiment.

The two torque gain calculators 97*c* and 107*c* respectively calculate a torque gain Gτ according to a steering torque τ using a torque gain map M9 shown in FIG. 18. The torque gain map M9 is stored in the storage unit (not shown) of the micro computer 42.

As shown in FIG. 18, the torque gain map M9 is a map in which a horizontal axis indicates a steering torque τ and a vertical axis indicates a torque gain GT. The torque gain map M9 defines the relationship between a steering torque τ and a torque gain Gτ. The torque gain map M9 has the following characteristics. That is, a torque gain Gτ remains at "1" regardless of a steering torque τ until the absolute value of the steering torque τ reaches a first setting value τ1 from zero. After the absolute value of the steering torque τ reaches the first setting value τ1, the torque gain Gτ decreases with an increase in the absolute value of the steering torque τ. Then, after the absolute value of the steering torque τ reaches a second setting value τ2 (>τ1), the torque gain Gτ remains at zero regardless of the steering torque τ.

According to the torque gain map M9, when the absolute value of a steering torque τ exceeds a first setting value τ1, a value of a torque gain Gτ becomes a value smaller than "1." Therefore, since added values $I_{U2}^*$ and $I_{L2}^*$ of respective limit values used to limit an assist controlled variable $I_{as}^*$ having a sign opposite to that of a steering torque τ are multiplied by the torque gain Gτ, the added values $I_{U2}^*$ and $I_{L2}^*$ decrease with a value of the torque gain GT. By a degree to which the added values $I_{U2}^*$ and $I_{L2}^*$ decrease, ultimate limit values ($I_{UL}^*$ and $I_{LL}^*$) on the assist controlled variable $I_{as}^*$ are prevented from extending in a direction opposite to that of the steering torque τ. Conversely, by the degree to which the added values $I_{U2}^*$ and $I_{L2}^*$ decrease, the ultimate limit values ($I_{UL}^*$ and $I_{LL}^*$) on the assist controlled variable $I_{as}^*$ extend in a direction the same as that of the steering torque τ. Therefore, the probability of calculating ultimate limit values ($I_{UL}^*$ and $I_{LL}^*$) having a sign the same as that of a steering torque τ becomes high. That is, an assist controlled variable $I_{as}^*$ having the sign the same as that of a steering torque τ is easily allowed.

In addition, since a value of a torque gain Gτ is set at zero after the absolute value of a steering torque τ reaches a second setting value τ2, added values $I_{U2}^*$ and $I_{L2}^*$ of respective limit values used to limit an assist controlled variable $I_{as}^*$ having a sign opposite to that of the steering torque τ become zero. Therefore, consequently, added values $I_{U1}^*$ and $I_{L1}^*$ of respective limit values used to limit an assist controlled variable $I_{as}^*$ having a sign the same as that of the steering torque τ directly become ultimate limit values ($I_{UL}^*$ and $I_{LL}^*$). In this case, the assist controlled variable $I_{as}^*$ having the sign the same as that of the steering torque τ is allowed, while the assist controlled variable $I_{as}^*$ having the sign opposite to that of the steering torque τ is limited to zero. That is, so-called a reverse assist in a direction opposite to that of the steering torque τ by which the intention of a driver is hindered is prevented.

Meanwhile, as shown by two-dot chain lines in FIG. 17, the multipliers 98*c* and 108*c* may be provided on the output paths of the adders 96*c* and 106*c*, respectively. Since added values $I_{U3}^*$ and $I_{L3}^*$ calculated by the adders 96*c* and 106*c* are multiplied by a torque gain Gτ, the added values $I_{U3}^*$ and $I_{L3}^*$ become values according to the torque gain Gτ. After the absolute value of a steering torque τ reaches a first setting value τ1, the added values $I_{U3}^*$ and $I_{L3}^*$, i.e., ultimate limit values ($I_{UL}^*$ and $I_{LL}^*$) on an assist controlled variable $I_{as}^*$ decrease with a value of the torque gain Gτ. By a degree to which the ultimate limit values ($I_{UL}^*$ and $I_{LL}^*$) decrease, the limitation range (allowed range) of the assist controlled variable $I_{as}^*$ having a sign opposite to that of the steering torque τ narrows. Therefore, so-called a reverse assist is prevented.

Accordingly, the embodiment may obtain the same effects as the effects (1) to (4) of the first embodiment. Note that the above respective embodiments may be modified as follows.

In the first and third embodiments, first and second setting values +τ1 and −τ1 of the guard maps M6 and M8 may be appropriately modified and set according to product specifications or the like. In the fourth embodiment, first and second setting values τ1 and τ2 of the torque gain map M9 may be appropriately modified and set according to product specifications or the like.

Essentially, an assist controlled variable $I_{as}^*$ to be limited differs with a vehicle speed V. In the first to fifth limit maps M1 to M5, limit values (upper and lower limits) are set based on, for example, the largest assist controlled variable $I_{as}^*$ among assist controlled variables $I_{as}^*$ that may be generated in all vehicle-speed ranges. Therefore, an abnormal assist controlled variable $I_{as}^*$ is not necessarily limited by optimum limit values. In this regard, respective limit values (upper limits $I_{UL1}^*$ to $I_{UL5}^*$ and lower limits $I_{LL1}^*$ to $I_{LL5}^*$) on an assist controlled variable $I_{as}^*$ may be set according to a vehicle speed V. Since respective limit values ($I_{UL1}^*$ to $I_{UL5}^*$ and $I_{LL1}^*$ to $I_{LL5}^*$) are changed in consideration of a vehicle speed V, it becomes possible to more promptly detect and limit an assist controlled variable $I_{as}^*$ that is to be essentially limited while being allowed in the first to fifth limit maps M1 to M5 in which the vehicle speed V is not taken into consideration. Accordingly, with the accuracy of respective limit values being improved, limitation processing performed on an assist controlled variable $I_{as}^*$ may be more properly performed.

What is claimed is:

1. An electric power steering apparatus comprising:
    a control unit that calculates an assist controlled variable based on a plurality of types of state variables indicating steering statuses and controls a motor that serves as a generation source of an assist force applied to a steering mechanism of a vehicle based on the assist controlled variable, wherein
    the control unit is configured to separately set limit values, which limit a change range of the assist controlled variable according to the respective state variables used to calculate the assist controlled variable, to the respective state variables, arithmetically add up the limit values to generate ultimate limit value for the assist controlled variable, and perform limitation processing to limit the ultimate limit value for an assist controlled variable having a sign opposite to a sign of a steering torque that is one of the plurality of types of state variables.

2. The electric power steering apparatus according to claim 1, wherein
    the limit values separately set to the respective state variables include a first limit value group used to limit an assist controlled variable having a sign same as a sign of a steering torque and a second limit value group used to limit an assist controlled variable having a sign opposite to the sign of the steering torque,
    the control unit is configured to add up the limit values constituting the first limit value group to calculate first added value, add up the limit values constituting the second limit value group to calculate second added value, and add up the first added value and the second added value to calculate third added value as the ultimate limit value for the assist controlled variable, and the control unit is configured to limit the third added value to limit the ultimate limit value for the assist controlled variable having the sign opposite to the sign of the steering torque.

3. The electric power steering apparatus according to claim 2, wherein the control unit is configured to perform limitation processing on the third added value when an absolute value of the steering torque reaches a setting value.

4. The electric power steering apparatus according to claim 3, wherein the control unit has a guard map that defines a relationship between the steering torque and limit values for the third added value and has a characteristic in which the limit values for the third added value gradually decrease toward zero after an absolute value of the steering torque reaches the setting value, and the control unit is configured to decrease the limit values for the third added value toward zero based on the guard map as the limitation processing on the third added value.

5. The electric power steering apparatus according to claim 3, wherein the control unit has a torque gain map that defines a relationship between the steering torque and a gain and has a characteristic in which the gain gradually decreases toward zero after the absolute value of the steering torque reaches a setting value, and the control unit is configured to multiply the third added value by the gain based on the torque gain map as the limitation processing on the third added value.

6. The electric power steering apparatus according to claim 1, wherein the limit values separately set to the respective state variables include a first limit value group used to limit an assist controlled variable having a sign same as a sign of a steering torque and a second limit value group used to limit an assist controlled variable having a sign opposite to the sign of the steering torque, the control unit is configured to add up the limit values constituting the first limit value group to calculate first added value, add up the limit values constituting the second limit value group to calculate second added value, and add up the first added value and the second added value to calculate third added value as the ultimate limit value for the assist controlled variable, and the control unit is configured to limit the second added value to limit the ultimate limit value for the assist controlled variable having the sign opposite to the sign of the steering torque.

7. The electric power steering apparatus according to claim 6, wherein the control unit is configured to limit the second added value according to the first added value.

8. The electric power steering apparatus according to claim 6, wherein the control unit is configured to perform limitation processing on the second added value when an absolute value of the steering torque reaches a setting value.

9. The electric power steering apparatus according to claim 8, wherein the control unit has a guard map that defines a relationship between the steering torque and limit values for the second added value and has a characteristic in which the limit values for the second added value gradually decrease toward zero after an absolute value of the steering torque reaches the setting value, and the control unit is configured to decrease the limit values for the second added value toward zero based on the guard map as the limitation processing on the second added value.

10. The electric power steering apparatus according to claim 8, wherein the control unit has a torque gain map that defines a relationship between the steering torque and a gain and has a characteristic in which the gain gradually decreases toward zero after an absolute value of the steering torque reaches the setting value, and the control unit is configured to multiply the second added value by the gain based on the torque gain map as the limitation processing on the second added value.

11. A controlling method for an electric power steering apparatus, the method comprising:

calculating an assist controlled variable based on a plurality of types of state variables indicating steering statuses;

controlling a motor that serves as a generation source of an assist force applied to a steering mechanism of a vehicle based on the assist controlled variable;

separately setting limit values, which limit a change range of the assist controlled variable according to the respective state variables used to calculate the assist controlled variable, to the respective state variables;

arithmetically adding up the limit values to generate ultimate limit value for the assist controlled variable; and performing limitation processing to limit the ultimate limit value for an assist controlled variable having a sign opposite to a sign of a steering torque that is one of the plurality of types of state variables.

* * * * *